United States Patent [19]
Giera et al.

[11] Patent Number: 5,725,607
[45] Date of Patent: Mar. 10, 1998

[54] METHOD FOR REDUCING THE TOXICITY OF SPENT LIQUORS AND NOVEL CATIONIC DYES

[75] Inventors: Henry Giera; Felix Reichel, both of Gladbach; Horst Berneth, Leverkusen; Thomas Böcker, Leichlingen, all of Germany; Karin Hassenrück, Mt. Pleasant, S.C.; Karl Lange, Fukuoka, Japan; Karlheinrich Meisel, Odenthal, Germany

[73] Assignee: Bayer Aktiengesellschaft, Leverkusen, Germany

[21] Appl. No.: 670,045

[22] Filed: Jun. 25, 1996

[30] Foreign Application Priority Data

Jul. 3, 1995 [DE] Germany ............... 195 24 134.7

[51] Int. Cl.⁶ .................................... D06P 1/41
[52] U.S. Cl. .......... 8/654; 8/655; 8/657; 8/658; 8/659; 8/539; 8/922; 8/924; 8/927; 8/436; 8/919; 8/917
[58] Field of Search ............ 8/654–659, 539, 8/917–927, 436

[56] References Cited

U.S. PATENT DOCUMENTS

| | | |
|---|---|---|
| 4,558,133 | 12/1985 | Beecken . |
| 4,925,926 | 5/1990 | Ronco et al. . |
| 5,077,396 | 12/1991 | Moser et al. ............... 534/606 |
| 5,208,325 | 5/1993 | Berneth et al. . |

FOREIGN PATENT DOCUMENTS

| | | |
|---|---|---|
| 0 019 997 A1 | 12/1980 | European Pat. Off. . |
| 0 023 991 A1 | 2/1981 | European Pat. Off. . |
| 0 272 212 A2 | 6/1988 | European Pat. Off. . |
| 0 495 250 A1 | 7/1992 | European Pat. Off. . |
| 0 624 628 A1 | 11/1994 | European Pat. Off. . |
| 52-47065 | 11/1977 | Japan . |

OTHER PUBLICATIONS

C.J. Cramer, et al., in "Review of Computational Chemistry", K.B. Lipowitz, et al., Eds., vol. 6, pp. 1–72, VCH Publishers, Inc. New York (1995).

J. Chem. Soc. Perkin Trans. 2 1993; "COSMO: A New Approach to Dielectric Screening . . . ," by A. Klamt, et al.

J.P. Stewart, Quant. Chem. Pro. Exch., vol. 10, pp. 86–87 (1990).

J. Tomasi, et al., Chem. Rev., vol. 94, pp. 2027–2094 (1994).

Chemical Abstracts, vol. 89, Abstract No. 89:7591g, Abstract of JP 52-47065 (1978).

Derwent Abstract, Derwent Week 9507, Abstract of JP 63-29934 (which is equivalent to EP 23 991) (1995).

*Primary Examiner*—Margaret Einsmann
*Attorney, Agent, or Firm*—Sprung Kramer Schaefer & Briscoe

[57] ABSTRACT

There has been found 1) a method for reducing the toxicity of spent liquors from dyeing with cationic dyes or mixtures thereof, characterized by the step of dyeing with cationic dyes having a computed electrostatic shielding energy (idealized hydration energy) of $\geq 50$ kcal/mol, 2) cationic, generally low toxicity dyes, their preparation and use for dyeing.

8 Claims, No Drawings

METHOD FOR REDUCING THE TOXICITY OF SPENT LIQUORS AND NOVEL CATIONIC DYES

Cationic dyes have long been used for dyeing suitable natural and synthetic materials. Such cationically dyeable materials include for example paper, leather, silk, tannin-treated cotton or other cellulose materials, polymers and copolymers of acrylonitrile or dicyanoethylene or acid-modified polyester or polyamide, in all possible forms such as flocks, fibres, yarns, wovens, knits or nonwovens.

The cationic dyes used for dyeing these materials are generally notable for high colour strength, brilliance and a high degree of exhaustion onto the material to be dyed. These properties make them superior to other types of dye, so that replacing them with the latter would be difficult and technically disadvantageous.

However, cationic dyes generally are highly toxic, especially for aquatic life forms, of which fish (vertebrates), daphniae (crustaceans) and algae (plants) may be mentioned as representative.

Owing to this high toxicity, and despite the high exhaustion of these dyes, the spent dyeing liquors are not suitable for passing into surface waters in the undiluted or moderately diluted state without further after treatments. Furthermore, accident-based contamination of waters with such dyes, for example, can impair the ecosystem of the waters.

It is an object of the present invention to make available less toxic cationic dyes that have similar application properties to the known dyes. A particular problem in this connection is that the toxicity towards fish, daphniae and algae is evidently very high in all known classes of cationic dyes and is substantially independent of the dye type. The literature did not disclose any correlations between structural features and toxicity.

It has now been found that, surprisingly, there is a (logarithmic) correlation between the computed idealized hydration energy of cationic dyes and their toxicity towards fish, daphniae and algae, which makes it possible to specifically select and synthesize low toxicity dyes.

The idealized hydration energy of cationic dyes was not determined experimentally, but calculated using a computerized method. This so-called COSMO energy was computed for conformation-optimized molecular structures using the method known from "Klamt, Schürmann, J. Chem. Soc. Perkin II, 1993, 799". However, it is also possible to use other computational models, for example as described in "Tomas, Persico, Chem. Rev. 1994, 94, 2027" or "Cramer, Truhlar, Reviews in Computational Chemistry, New York, Vol. 6". Confirmation optimization was effected by the semiempirical AM1 method using the MOPAC program ("J. P. Stewart, Quant. Chem. Prog. Exch., 10:86, 1990").

The measure of toxicity used was the value of the lethal concentration (in the case of fish) or effective concentration (in the case of daphniae) in water whereat, after the test has ended, 50% of the animals have, respectively, died or stopped moving ($LCF_{50}$ and $ECD_{50}$, respectively). The test duration was 96 hours in the case of fish and 48 h in the case of daphniae. The effect on algae was investigated in the cell multiplication inhibition test. The test duration was 72 hours. The measure of toxicity used was the effective concentration in water whereat the growth rate is 50% of that without active substance ($ECA_{50}$). It was found, then, that, largely independently of the structural class of the cationic dyes, the toxicity towards fish, daphniae and algae is >15 to 20 µmol/l when the hydration energy COSMO is $\geq 50$ kcal/mol, preferably >55 kcal/mol. In the case of molecular weights (inclusive of anions) of 500 to 650 g/tool for typical cationic dyes, a concentration of 15 to 20 µmol/l corresponds to about 10 mg/l.

The present invention accordingly provides a method for reducing the toxicity of spend liquors from dyeing with cationic dyes or mixtures thereof, characterized by the step of dyeing with cationic dyes having a computed electrostatic shielding energy (idealized hydration energy) of >50 kcal/mol, in particular of more than 55 kcal/mol.

To have COSMO energies (idealized hydration energies) above the specified limits, the dyes have to have hydrophilic radicals. Since the effect of the individual hydrophilic radicals differs, the total number of the radicals required for the limits to be exceeded depends on the type of radical. Similarly, their position in the molecule has a certain influence on the effect. Overall, however, it is possible to state that, in general, COSMO values above the specified limits are achieved with at least two hydrophilic radicals in the dye molecule.

A particular aspect of the invention is accordingly a method for reducing the toxicity of spent liquors, characterized in that the cationic dyes used have at least two hydrophilic radicals.

Hydrophilic radicals for the purposes of this invention are those which carry polar groups. Such polar groups generally contain hetero atoms such as oxygen, nitrogen, fluorine and/or sulphur.

These polar radicals can be bonded to the dye molecule directly or via spacer groups, for example alkylene or arylene radicals.

The polar groups are preferably selected from the group consisting of perfluoro-$C_1$-$C_4$-alkyl, $C_1$-$C_3$-alkoxy, cyano, nitro, $SO_2$, $C=O$, hydroxyl, NH and —O—. They can also be combined with each other, for example to form hydroxycarbonyl, alkoxysulphonyl, alkanoylamino, perfluoroalkylsulphonylamino, etc. $SO_2$, $C=O$, NH and —O— can also be part of rings, for example tetrahydrothiophene 1,1-dioxide (tetramethylene sulphone).

In some cases it is necessary, if optimum application properties such as affinity or compatibility are to be obtained, to counteract the effect of hydrophilic radicals by incorporating hydrophobic, preferably cyclic, radicals. Advantageous for this purpose have been found to be in particular aromatic radicals, cycloalkyl radicals and saturated heterocyclic radicals. Examples are phenyl, tolyl, benzyl, phenethyl, cyclopentyl, cyclohexyl, pyrrolidino, piperidino. They can also be combined with the polar groups, for example to form benzoylamino.

If, then, such cationic dyes according to this invention, or mixtures thereof, are used under customary dyeing conditions, the dyehouse wastewater obtained does not produce acute harm in aquatic life forms such as fish and daphniae when passed into surface waters in an undiluted or moderately diluted state.

EXAMPLES

EXAMPLES 1 to 66

The examples which follow illustrate for a multiplicity of different dyes the calculated COSMO hydration energies in kcal/mol (=COSMO) and the toxicities towards fish ($LCF_{50}$), daphniae ($ECD_{50}$) and algae ($ECA_{50}$), in each case in mg/l, measured for the dyes. These values were determined as described above. Additionally, the HP column indicates in each case the number of hydrophilic radicals present per molecule and the EV column indicates whether the dye in question is an example according to this invention (=E) or a comparative example (=V).

It is clear that dyes having a COSMO hydration energy of above 50 kcal/mol are distinctly less toxic than dyes having COSMO hydration energies of less than 50 kcal/mol. It is also evident that the toxicity of the dyes decreases with an increasing number of hydrophilic radicals present per molecule.

| Example No. | Dye | HP | $ECD_{50}$ | $LCF_{50}$ | $ECA_{50}$ | COMSO | EV |
|---|---|---|---|---|---|---|---|
| 1 | (CH₃)₃N⁺(CH₂)₂O—CO.C(CN)=CH—C₆H₄—N(CH₂CH₂CN)(CH₂CH₂CN) | 5 | 316 | — | — | 78.6 | E |
| 2 | (CH₃)₃N⁺(CH₂)₂O—CO.C(CN)=CH—C₆H₄—N(CH₂C₆H₅)(CH₂CH₂CN) | 4 | 56.2 | — | — | 77.1 | E |
| 3 | (CH₃)₃N⁺(CH₂)₂O—CO.C(CN)=CH—C₆H₄—N(CH₃)(C₆H₅) | 3 | 6.4 | — | 38 | 69.4 | E |
| 4 | indolenine-vinyl-indole dye (CH₂CH₂CN substituents) | 2 | 13.2 | — | — | 51.6 | E |
| 5 | CH₃O—C₆H₄—N=N⁺(N—)—C₆H₄—NO₂ (cyclic triazene) | 2 | 31.6 | — | >100 | 64.5 | E |
| 6 | CH₃O—C₆H₄—N=N⁺(N—)—C₆H₄—NHCOCH₃ (cyclic triazene) | 3 | 17 | — | >100 | 55.8 | E |
| 7 | pyrazolium-azo-indole dye (N-CH₃) | 1 | 47 | — | — | 50.7 | E |
| 8 | pyrazolium-azo-indole dye (N-H) | 2 | 170 | — | — | 55.0 | E |

| Example No. | Dye | HP | ECD$_{50}$ | LCF$_{50}$ | ECA$_{50}$ | COMSO | EV |
|---|---|---|---|---|---|---|---|
| 9 | 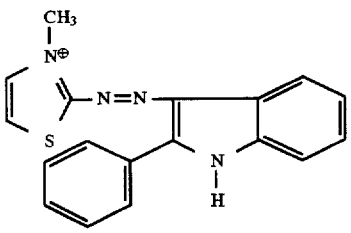 | 1 | 31 | — | 22 | 48.8 | V |
| 10 | 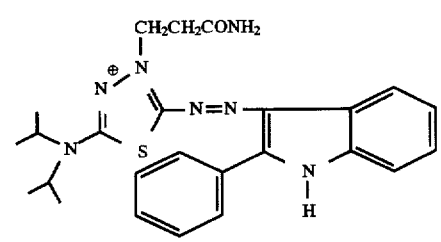 | 2 | 31.6 | 178 | — | 52.2 | E |
| 11 | 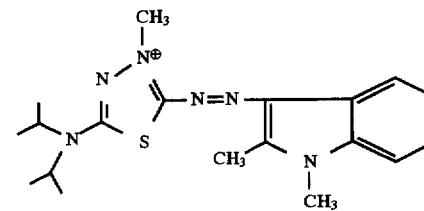 | 0 | 0.4 | — | — | 40.3 | V |
| 12 | 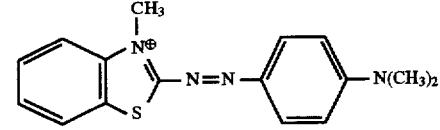 | 0 | 0.6 | — | — | 41.6 | V |
| 13 | 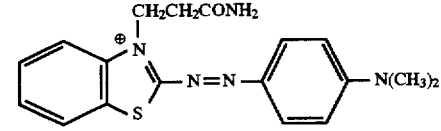 | 2 | 10.1 | — | — | 50.4 | E |
| 14 | 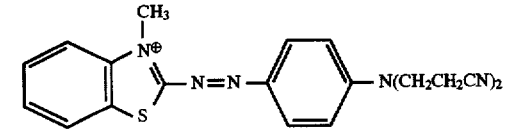 | 4 | 56.2 | — | — | 62.3 | E |
| 15 | 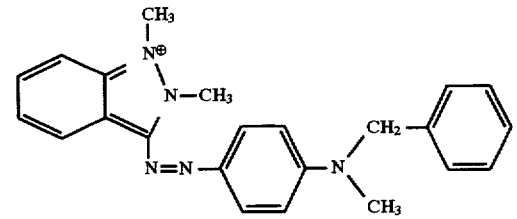 | 0 | 0.03 | — | <1 | 41.4 | V |
| 16 | 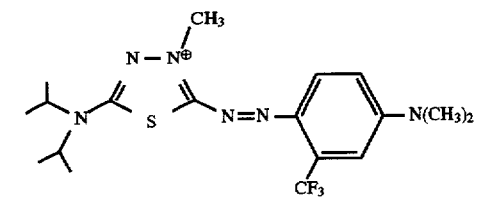 | 1 | 1 | — | — | 42.1 | V |

-continued

| Example No. | Dye | HP | ECD$_{50}$ | LCF$_{50}$ | ECA$_{50}$ | COMSO | EV |
|---|---|---|---|---|---|---|---|
| 17 | (structure) | 1 | 1 | — | — | 39.5 | V |
| 18 | (structure) | 2 | 10 | 100 | — | 47.7 | V |
| 19 | (structure) | 3 | 316 | 56.2 | — | 51.9 | E |
| 20 | (structure) | 1 | 3.2 | — | — | 44.1 | V |
| 21 | (structure) | 2 | 10 | — | — | 50 | E |
| 22 | (structure) | 3 | 20 | — | — | 53.1 | E |
| 23 | (structure) | 3 | >100 | — | — | 56.7 | E |
| 24 | (structure) | 2 | 70 | — | 46 | 53.8 | E |

-continued

| Example No. | Dye | HP | ECD$_{50}$ | LCF$_{50}$ | ECA$_{50}$ | COMSO | EV |
|---|---|---|---|---|---|---|---|
| 25 | (structure) | 3 | 72 | — | 19 | 60.9 | E |
| 26 | (structure) | 2 | 18.5 | — | — | 54.9 | E |
| 27 | (structure) | 2 | 20 | — | 7.7 | 52 | 3 |
| 28 | (structure) | 0 | 0.1 | — | — | 43.6 | V |
| 29 | (structure) | 4 | 45 | — | 8.4 | 57.2 | E |
| 30 | (structure) | 3 | 14.7 | — | — | 60.7 | E |
| 31 | (structure) | 5 | 281 | >100 | >100 | 67.5 | E |
| 32 | (structure) | 2 | 11 | — | — | 53.9 | E |

-continued

| Example No. | Dye | HP | ECD$_{50}$ | LCF$_{50}$ | ECA$_{50}$ | COMSO | EV |
|---|---|---|---|---|---|---|---|
| 33 | C$_2$H$_5$—O—⟨C$_6$H$_4$⟩—NH—C(S)—N=N—N$^{\oplus}$(CH$_3$)—C=N—N=⟨C$_6$H$_4$⟩—N(CH$_3$)(CH$_2$CH$_2$CN) | 3 | 24.4 | — | — | 56.3 | E |
| 34 | CH$_3$O—⟨C$_6$H$_4$⟩—NH—C(S)—N=N—N$^{\oplus}$(CH$_2$CH$_2$CONH$_2$)—C=N—N=⟨C$_6$H$_4$⟩—N(CH$_3$)$_2$ | 4 | 16.1 | — | — | 59.2 | E |
| 35 | (3-CN)⟨C$_6$H$_4$⟩—NH—C(S)—N=N—N$^{\oplus}$(CH$_2$CH$_2$CN)—C=N—N=⟨C$_6$H$_4$⟩—N(CH$_3$)(CH$_2$CH$_2$CN) | 4 | 142 | — | >100 | 66 | E |
| 36 | ⟨C$_6$H$_5$⟩—N(CH$_3$)—C(S)—N=N—N$^{\oplus}$(CH$_2$CH$_2$CN)—C=N—N=⟨C$_6$H$_4$⟩—N(CH$_3$)(CH$_2$CH$_2$CN) | 2 | 31.6 | — | — | 56.8 | E |
| 37 | (iPr)$_2$N—C(S)—N=N—N$^{\oplus}$(CH$_3$)—C=N—N=⟨C$_6$H$_4$⟩—N(CH$_2$CH$_2$CN)$_2$ | 2 | 31.6 | — | — | 52.3 | E |
| 38 | (iPr)$_2$N—C(S)—N=N—N$^{\oplus}$(CH$_2$CH$_2$CONH$_2$)—C=N—N=⟨C$_6$H$_4$⟩—N(CH$_3$)(CH$_2$CH$_2$CN) | 3 | 31.6 | — | — | 54.9 | E |
| 39 | (iPr)$_2$N—C(S)—N=N—N$^{\oplus}$(CH$_3$)—C=N—N=⟨C$_6$H$_4$⟩—N(CH$_3$)((CH$_2$)$_3$CN) | 1 | 1.6 | — | — | 45.4 | V |
| 40 | ⟨C$_6$H$_5$⟩—CH$_2$—NH—C(S)—N=N—N$^{\oplus}$(CH$_3$)—C=N—N=⟨C$_6$H$_4$⟩—N(CH$_3$)$_2$ | 1 | 0.6 | — | — | 46.6 | V |

-continued

| Example No. | Dye | HP | ECD₅₀ | LCF₅₀ | ECA₅₀ | COMSO | EV |
|---|---|---|---|---|---|---|---|
| 41 | (structure) | 2 | 31.6 | — | — | 58.5 | E |
| 42 | (structure) | 1 | 56.2 | — | 14 | 54.4 | E |
| 43 | (structure) | 2 | 178 | — | — | 61.4 | E |
| 44 | (structure) | 2 | 17.8 | — | — | 58.2 | E |
| 45 | (structure) | 3 | 31.6 | — | — | 55.2 | E |
| 46 | (structure) | 4 | 23.9 | — | — | 52.5 | E |
| 47 | (structure) | 3 | 56 | — | — | 58.4 | E |
| 48 | (structure) | 1 | 3.2 | — | 0.11 | 44.2 | V |

-continued

| Example No. | Dye | HP | ECD$_{50}$ | LCF$_{50}$ | ECA$_{50}$ | COMSO | EV |
|---|---|---|---|---|---|---|---|
| 49 | HOCH$_2$CH$_2$—N$^{\oplus}$(pyridinium)—CH=CH—C$_6$H$_4$—N(CH$_2$CH$_2$CN)$_2$ | 3 | 17.9 | — | — | 65.8 | E |
| 50 | HOCH$_2$CH$_2$—N$^{\oplus}$(pyridinium)—CH=CH—C$_6$H$_4$—N(CH$_2$C$_6$H$_5$)(CH$_2$CH$_2$CN) | 2 | 10 | — | — | 59.3 | E |
| 51 | C$_6$H$_5$—CH$_2$CH$_2$—N$^{\oplus}$(pyridinium)—CH=CH—C$_6$H$_4$—N(CH$_2$CH$_2$CN)$_2$ | 2 | 10 | — | — | 61.6 | E |
| 52 | C$_6$H$_5$—COCH$_2$CH$_2$—N$^{\oplus}$(pyridinium)—CH=CH—C$_6$H$_4$—N(CH$_2$CH$_2$CN)$_2$ | 4 | 56 | — | — | 71.5 | E |
| 53 | H$_2$NC(O)—CH$_2$CH$_2$—N$^{\oplus}$(pyridinium)—CH=CH—C$_6$H$_4$—N(CH$_2$C$_6$H$_5$)(CH$_2$CH$_2$OH) | 3 | 31.6 | — | — | 65.1 | E |
| 54 | C$_6$H$_5$—CH(CH$_3$)—N$^{\oplus}$(pyridinium)—CH=CH—C$_6$H$_4$—N(C$_2$H$_5$)(CH$_2$C$_6$H$_5$) | 0 | 1 | — | — | 48.5 | V |
| 55 | 1,3-dimethyl-uracilium—CH=CH—C$_6$H$_4$—N(CH$_3$)(CH$_2$CH$_2$CN) | 2 | 56.2 | — | — | 56.3 | E |
| 56 | 1,3,3-trimethyl-3H-indolium—CH=CH—C$_6$H$_4$—N(CH$_2$CH$_2$CN)$_2$ | 2 | 10 | — | — | 54.2 | E |
| 57 | 3,3-dimethyl-1-(2-cyanoethyl)-3H-indolium—CH=CH—C$_6$H$_4$—N(CH$_2$CH$_2$CN)$_2$ | 3 | 316 | 178 | 100 | 59.8 | E |
| 58 | 3,3-dimethyl-1-(2-cyanoethyl)-3H-indolium—CH=CH—C$_6$H$_4$—N(CH$_3$)(CH$_2$CH$_2$CN) | 2 | 53 | — | — | 52.1 | E |

-continued

| Example No. | Dye | HP | ECD$_{50}$ | LCF$_{50}$ | ECA$_{50}$ | COMSO | EV |
|---|---|---|---|---|---|---|---|
| 59 | (indolinium with CH$_3$, CH$_3$, N$^+$–CH$_2$CH$_2$CN, –CH=CH–C$_6$H$_3$(CH$_3$)–N(CH$_2$CH$_2$CN)$_2$) | 3 | 56.2 | — | — | 59.3 | E |
| 60 | (indolinium with CH$_3$, CH$_3$, N$^+$–CH$_2$–CH=CH$_2$, –CH=CH–C$_6$H$_3$(CH$_3$)–N(C$_2$H$_5$)$_2$) | 0 | 0.32 | — | — | 37.5 | V |
| 61 | (C$_4$H$_9$N–C(=O)–N$^+$(C$_4$H$_9$)–C(=CH–CH=)–CH=N–N(CH$_3$)–C$_6$H$_4$–CH$_3$) | 1 | 5.5 | — | 1.3 | 44.6 | V |
| 62 | (C$_4$H$_9$N–C(=O)–N$^+$(C$_4$H$_9$)–C(=CH–CH=)–CH=N–NH–C$_6$H$_3$(CH$_3$)(NO$_2$)) | 3 | 676 | 5.6 | >125 | 57.3 | E |
| 63 | (indolinium with CH$_3$, CH$_3$, N$^+$–CH$_2$CH$_2$CONH$_2$, –CH=N–N(CH$_3$)–C$_6$H$_4$–OCH$_3$) | 3 | 10.1 | 316 | 4.1 | 53.8 | E |
| 64 | (NCCH$_2$CH$_2$–N$^+$=... bromo-naphthalene with –C$_6$H$_4$–N(C$_2$H$_5$)$_2$) | 1 | 0.5 | 3.2 | — | 46.8 | V |
| 65 | (C$_2$H$_5$–N$^+$=... bromo-naphthalene with –C$_6$H$_4$–N(CH$_3$)(CH$_2$CH$_2$CN)) | 1 | 5.6 | — | — | 45.1 | V |

-continued

| Example No. | Dye | HP | ECD$_{50}$ | LCF$_{50}$ | ECA$_{50}$ | COMSO | EV |
|---|---|---|---|---|---|---|---|
| 66 | 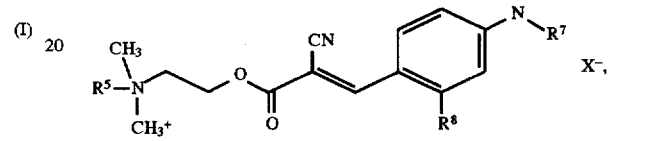 | 2 | 40.3 | — | 81 | 50 | E |

A further aspect of this invention are cationic dyes of the formula

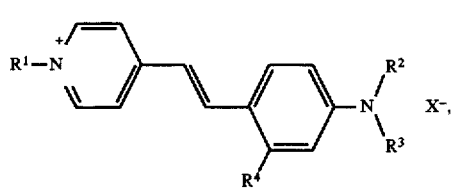 (I)

where

R$^1$ and R$^3$ are independently of each other —(CH$_2$)$_n$—N(C$_1$–C$_4$)-alkyl)$_2$, hydroxy-C$_2$–C$_6$-alkyl, acetoxy-C$_2$–C$_6$-alkyl, cyano-C$_2$–C$_6$-alkyl, amidocarbonyl-C$_2$–C$_6$-alkyl, —(CH$_2$)$_n$—O—(CH$_2$)$_m$—OH or —(CH$_2$)$_n$—O—(CH$_2$)$_m$—OCOCH$_3$, R$^2$ is C$_1$–C$_6$-alkyl, benzyl or phenethyl or has the meaning of R$^3$, R$^4$ is hydrogen or C$_1$–C$_6$-alkyl, n and m are independently of each other 2, 3 or 4, and X$^-$ is an anion.

A particular aspect of this invention are cationic dyes of the formula (I) where R$^1$ and R$^3$ are independently of each other —(CH$_2$)$_2$—N(CH$_3$)$_2$—, —(CH$_2$)$_3$—N(CH$_3$)$_2$, —(CH$_2$)$_3$—N(C$_2$H$_5$)$_2$, —CH$_2$CH$_2$OH, —CH$_2$CH(OH)CH$_3$, —CH$_2$CH$_2$—OCOCH$_3$, —CH$_2$CH$_2$CN, —(CH$_2$)$_2$CONH$_2$, —(CH$_2$)$_2$—O—(CH$_2$)$_2$—OH or —(CH$_2$)$_2$—O—(CH$_2$)$_2$—OCOCH$_3$, R$^2$ is methyl, ethyl, propyl, isopropyl, butyl, isobutyl, s-butyl, benzyl or phenethyl or has the meaning of R$^3$, R$^4$ is hydrogen or methyl, and X$^-$ is an anion.

A very particular aspect of this invention is cationic dyes of the formula (I) where R$^1$ is —(CH$_2$)$_2$—OH or —(CH$_2$)$_2$—CONH$_2$, R$^2$ is benzyl, R$^3$ is —(CH$_2$)$_2$—OH or —(CH$_2$)$_2$—CN, R$^4$ is hydrogen, and X$^-$ is an anion.

A further aspect of this invention is cationic dyes of the formula (II)

$$\begin{array}{c}\text{CH}_3\\R^5-\overset{|}{\underset{\underset{\text{CH}_3^+}{|}}{N}}-\text{CH}_2\text{CH}_2-\text{O}-\overset{\text{O}}{\underset{}{\text{C}}}-\overset{\text{CN}}{\underset{}{\text{C}}}=\text{CH}-\text{C}_6\text{H}_3(\text{R}^8)-\text{N}(\text{R}^6)(\text{R}^7)\end{array}$$ X$^-$, where R$^5$ is C$_1$–C$_6$-alkyl, hydroxy-C$_2$–C$_6$-alkyl, acetoxy-C$_2$–C$_6$-alkyl, —(CH$_2$)$_n$—O—(CH$_2$)$_m$—OH or —(CH$_2$)$_n$—O—(CH$_2$)$_m$—OCOCH$_3$, R$^6$ is C$_1$–C$_6$-alkyl, benzyl or phenethyl or has the meaning of R$^7$, R$^7$ is —(CH$_2$)$_n$—N(C$_1$–C$_4$-alkyl)$_2$, hydroxy-C$_2$–C$_6$-alkyl, amidocarbonyl-C$_2$–C$_6$-alkyl or —(CH$_2$)$_n$—O—(CH$_2$)$_m$—OH, R$^8$ is hydrogen or C$_1$–C$_6$-alkyl, n and m are independently of each other 2, 3 or 4, and X$^-$ is an anion.

A particular aspect of this invention is cationic dyes of the formula (II) where R$^5$ is methyl, ethyl, propyl, isopropyl, butyl, isobutyl, s-butyl, —CH$_2$CH$_2$OH, —CH$_2$CH(OH)CH$_3$, —CH$_2$CH$_2$OCOCH$_3$, —CH$_2$CH(CH$_3$)OCOCH$_3$, —(CH$_2$)$_2$—O—(CH$_2$)$_2$—OH or —(CH$_2$)$_2$—O—(CH$_2$)$_2$—OCOCH$_3$, R$^6$ is methyl, ethyl, propyl, isopropyl, butyl, isobutyl, s-butyl, benzyl or phenethyl or has the meaning of R$^7$, R$^7$ is —(CH$_2$)$_2$—N(CH$_3$)$_2$—, —(CH$_2$)$_3$—N(CH$_3$)$_2$, —(CH$_2$)$_3$—N(C$_2$H$_5$)$_2$, —CH$_2$CH$_2$OH, —CH$_2$CH(OH)CH$_3$, —(CH$_2$)$_2$CONH$_2$ or —(CH$_2$)$_2$—O—(CH$_2$)$_2$—OH, R$^8$ is hydrogen or methyl, and X$^-$ is an anion.

A very particular aspect of this invention is cationic dyes of the formula (II) where R$^5$ is hydroxyethyl or acetoxyethyl, R$^6$ is benzyl or phenethyl, R$^7$ is —(CH$_2$)$_3$—N(CH$_3$)$_2$ or cyanoethyl, R$^8$ is hydrogen or methyl, and X$^-$ is an anion.

A further aspect of this invention is cationic dyes of the formula (III)

where $R^9$ and $R^{11}$ are independently of each other hydrogen, halogen, $C_1$–$C_6$-alkyl or $C_1$–$C_6$-alkoxy.

$R^{10}$ is unsubstituted or halogen-, cyano-, hydroxyl-, $C_1$–$C_4$-alkoxy- or phenyl-substituted $C_1$–$C_6$-alkyl.

$R^{12}$ denotes unsubstituted or halogen-, cyano-, hydroxyl-, $C_1$–$C_4$-alkoxy- or phenyl-substituted $C_1$–$C_6$-alkyl, $C_4$–$C_7$-cycloalkyl or phenyl radicals.

$R^{13}$ and $R^{14}$ denote independently of each other hydrogen, unsubstituted or halogen-, cyano-, hydroxyl-, $C_1$–$C_4$-alkoxy- or phenyl-substituted $C_1$–$C_6$-alkyl, $C_4$–$C_7$-cycloalkyl or phenyl radicals, or $NR^{13}R^{14}$ is pyrrolidino, piperidino or morpholino, and $X^-$ is an anion.

A particular aspect of this invention is cationic dyes of the formula (III) where $R^9$ and $R^{11}$ are independently of each other hydrogen, chlorine, methyl or methoxy, $R^{10}$ is methyl, ethyl, hydroxyethyl, 2-hydroxypropyl, cyanoethyl, amidocarbonyl-ethyl or benzyl.

$R^{12}$ is methyl, ethyl, propyl, butyl, trifluoromethyl, phenyl, tolyl or chlorophenyl.

$R^{13}$ and $R^{14}$ are independently of each other methyl, ethyl, propyl, butyl, benzyl, hydroxyethyl, methoxyethyl, cyanoethyl, phenyl, tolyl, methoxyphenyl or chlorophenyl, and $R^{13}$ may additionally be hydrogen, or $NR^{13}R^{14}$ is pyrrolidino, piperidino or morpholino, and $X^-$ is anion.

A very particular aspect of this invention is cationic dyes of the formula (III) where $R^9$ is hydrogen or methoxy.

$R^{10}$ is methyl.

$R^{11}$ is hydrogen, methyl or methoxy.

$R^{12}$ is methyl or ethyl.

$NR^{13}R^{14}$ is dimethylamino, diethylamino, dipropylamino or pyrrolidino, and $X^-$ is an anion.

A further aspect of this invention is cationic dyes of the formula phenoxy, $C_1$–$C_6$-alkanoylamino, benzoylamino, $C_1$–$C_6$-alkanesulphonylamino, benzenesulphonylamino, cyano or nitro.

$R^{18}$ is hydrogen or $C_1$–$C_6$-alkyl.

$R^{19}$ is hydrogen, methyl or methoxy.

Z is a bridge of the formulae —$(CH_2)_m$—, O, NH, $SO_2$, NHCO, NHCONH, $NHSO_2NH$, NHCOCONH or $$\underset{O}{\overset{N-N}{\bigwedge\bigwedge}}$$

m is 1, 2 or 3, and $X^-$ is an anion.

A particular aspect of this invention is cationic dyes of the formula (IV) where $R^{15}$, $R^{16}$ and $R^{17}$ are independently of one another hydrogen, chlorine, methyl, ethyl, methoxy, ethoxy, phenoxy, acetylamino, propionylamino, benzoylamino, methanesulphonylamino, ethanesulphonylamino, cyano or nitro, $R^{16a}$ and $R^{19}$ are each hydrogen, $R^{18}$ is hydrogen or methyl.

Z is a bridge of the formulae $CH_2$, $CH_2CH_2$, NH, NHCO, NHCONH or $$\underset{O}{\overset{N-N}{\bigwedge\bigwedge}},$$

and $X^-$ is an anion.

A very particular aspect of this invention is cationic dyes of the formula (IV) where $R^{15}$ is methoxy, phenoxy or acetylamino, $R^{16}$ is hydrogen, methyl or methoxy, $R^{16a}$, $R^{17}$ $R^{18}$ and $R^{19}$ are each hydrogen, Z is NH, NHCO, NHCONH or $$\underset{O}{\overset{N-N}{\bigwedge\bigwedge}},$$

and $X^-$ is an anion.

A further aspect of this invention is cationic dyes of the formula (IV)

where $R^{15}$, $R^{16}$, $R^{16a}$ and $R^{17}$ are independently of one another hydrogen, halogen, $C_1$–$C_6$-alkyl, $C_1$–$C_6$-alkoxy,

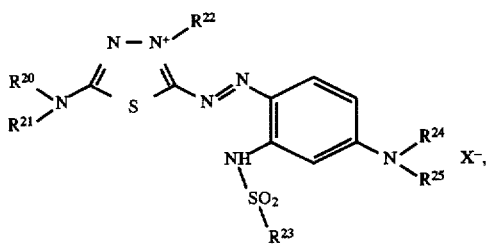

(V)

where $R^{20}$, $R^{21}$, $R^{24}$ and $R^{25}$ are independently of each other unsubstituted or hydroxyl-, cyano- or methoxy-substituted $C_1$–$C_6$-alkyl, benzyl, unsubstituted or methyl-, methoxy- or cyano-substituted phenyl or tetramethylene- sulphonyl, and $R^{20}$ and $R^{24}$ may independently of each other additionally denote hydrogen, or $NR^{20}R^{21}$ and $NR^{24}R^{25}$ may independently of each other be pyrrolidino, piperidino or morpholino, $R^{22}$ and $R^{23}$ are independently of each other $C_1$–$C_6$-alkyl, and $X^-$ is an anion.

A particular aspect of this invention is cationic dyes of the formula (V) where $R^{20}$ and $R^{21}$ are independently of each other $C_1$–$C_6$-alkyl, $R^{22}$ and $R^{23}$ are independently of each other $C_1$–$C_4$-alkyl, $R^{24}$ and $R^{25}$ are independently of each other $C_1$–$C_6$-alkyl, benzyl or phenyl, or $NR^{24}R^{25}$ is pyrrolidino or piperidino, and $X^-$ is an anion.

A very particular aspect of this invention is cationic dyes of the formula (V) where $R^{20}R^{21}$ is diisopropylamino, $R^{22}$ is methyl, $R^{23}$ is methyl or ethyl, $NR^{24}R^{25}$ is dimethylamino, diethylamino, dipropylamino or pyrrolidino, and $X^-$ is an anion.

A further aspect of this invention are cationic dyes of the formula

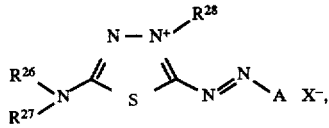

(VI)

where

A represents a structure of the formula

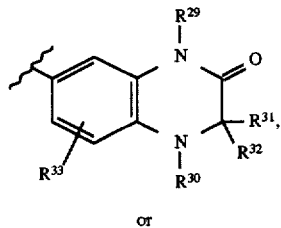

(VII)

or

-continued

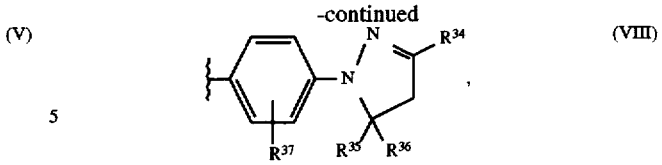

(VIII)

where $R^{26}$ and $R^{27}$ are independently of each other unsubstituted or OH—, CN— or $CONH_2$-substituted $C_1$–$C_4$-alkyl, $R^{28}$ is a linear or branched $C_1$–$C_4$-alkyl, cyano-$C_1$–$C_4$-alkyl, hydroxy-$C_1$–$C_4$-alkyl, amido-$C_1$–$C_4$-alkyl, $C_1$–$C_4$-alkoxycarbonyl-$C_1$–$C_4$-alkyl, benzyl, phenethyl or pyridylethyl radical, $R^{29}$ and $R^{30}$ are independently of each other hydrogen, $C_1$–$C_4$-alkyl, $C_7$–$C_9$-aralkyl or $C_4$–$C_7$-cycloalkyl, $R^{31}$ and $R^{32}$ are independently of each other hydrogen, $C_1$–$C_4$-alkyl, $C_6$–$C_{10}$-aryl, $C_7$–$C_9$-aralkyl or $C_4$–$C_7$-cycloalkyl, or may together with the linking carbon atom form a ring with 5, 6 or more members, $R^{33}$ denotes one or more $C_1$–$C_4$-alkyl, $C_1$–$C_4$-alkoxy, $C_7$–$C_9$-aralkyl, $C_4$–$C_7$-cyclo-alkyl, halogen, $C_1$–$C_4$-alkylcarbonylamino or $C_1$–$C_4$-alkylsulphonylamino radicals, $R^{36}$ is $C_1$–$C_4$-alkyl, $R^{34}$ and $R^{35}$ are independently of each other $C_1$–$C_4$-alkyl or $C_6$–$C_{10}$-aryl, $R^{37}$ denotes one or more $C_1$–$C_4$-alkyl, chlorine, bromine, $C_1$–$C_4$-alkoxy, $C_1$–$C_4$-alkoxycarbonyl or $C_1$–$C_4$-acylamino radicals, and $X^-$ is an anion.

A particular aspect of this invention is cationic dyes of the formula (VI) where A represents a structure of the formulae (VII) or (VIII) where $R^{26}$ and $R^{27}$ are independently of each other unsubstituted or OH— or CN— substituted $C_1$–$C_3$-alkyl, $R^{28}$ is a linear or branched $C_1$–$C_4$-alkyl, cyano-$C_1$–$C_2$-alkyl, hydroxy-$C_1$–$C_3$-alkyl, amido-$C_1$–$C_2$-alkyl or benzyl radical, $R^{29}$ and $R^{30}$ are independently of each other hydrogen or $C_1$–$C_4$-alkyl, $R^{31}$ and $R^{32}$ are independently of each other hydrogen or $C_1$–$C_4$-alkyl, or can form together with the linking carbon atom a 5- or 6-membered ring, $R^{33}$ is $C_1$–$C_4$-alkyl, $C_1$–$C_4$-alkoxy, $C_6$-aryl, $C_5$- or $C_6$-cycloalkyl, halogen, $C_1$–$C_4$-alkylcarbonylamino or $C_1$–$C_4$-alkylsulphonylamino, $R^{36}$ is $C_1$–$C_4$-alkyl, $R^{34}$ and $R^{35}$ are independently of each other $C_1$–$C_4$-alkyl or $C_6$-aryl, $R^{37}$ is $C_1$–$C_4$-alkyl, chlorine, bromine, $C_1$–$C_4$-alkoxy, $C_1$–$C_4$-alkoxycarbonyl or $C_1$–$C_4$-acylamino, and $X^-$ is an anion.

A very particular aspect of this invention is cationic dyes of the formula (VI) where A represents a structure of the formulae (VII) or (VIII) where $R^{26}$ and $R^{27}$ are independently of each other methyl, ethyl, propyl, isopropyl, cyanoethyl or 2-hydroxypropyl, $R^{28}$ is methyl, ethyl, propyl, butyl, cyanoethyl, 2-hydroxypropyl, amidoethyl or benzyl, $R^{29}$ and $R^{30}$ are independently of each other hydrogen, methyl, ethyl or butyl, $R^{31}$ and $R^{32}$ are independently of each other hydrogen, methyl or ethyl or can together with the linking carbon atom form a cyclopentane or cyclohexane ring, $R^{33}$ is methyl, methoxy, chlorine, bromine, methylcarbonylamino or methylsulphonylamino, $R^{36}$ is methyl, $R^{34}$ and $R^{35}$ are independently of each other methyl or phenyl, $R^{37}$ is methyl, chlorine, bromine, methoxy, methoxycarbonyl or acetylamino, and $X^-$ is an anion.

A further aspect of this invention is cationic dyes of the formula (IX)

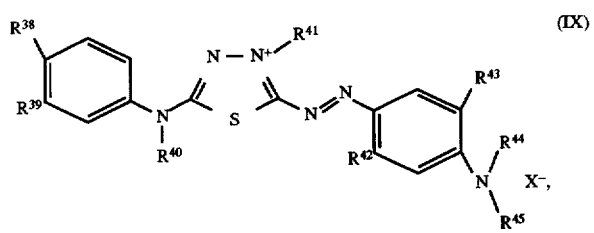

where $R^{38}$ and $R^{39}$ are independently of each other hydrogen, $C_1$–$C_6$-alkyl, $C_1$–$C_4$-perfluoroalkyl, halogen, nitro, cyano, $C_1$–$C_4$-alkoxy, $C_6$–$C_{10}$-aryloxy, $C_1$–$C_4$-alkylcarbonyl, $C_1$–$C_4$-dialkylamino, aminocarbonyl, $C_1$–$C_4$-alkylcarbonylamino, $C_1$–$C_4$-alkoxycarbonyl, $C_1$–$C_4$-alkylsulphonyl or $C_6$–$C_{10}$-arylsulphonyl, $R^{40}$ and $R^{41}$ are independently of each other unsubstituted or cyano-, hydroxyl-, aminocarbonyl-, $C_1$–$C_4$-mono- or-dialkylaminocarbonyl-, $C_1$–$C_4$-alkoxycarbonyl- or carboxyl-substituted $C_1$–$C_6$-alkyl but may not both be unsubstituted $C_1$–$C_6$-alkyl, $R^{42}$ and $R^{43}$ are independently of each other hydrogen, $C_1$–$C_6$-alkyl, $C_1$–$C_4$-perfloroalkyl, halogen, nitro, cyano, $C_1$–$C_4$-alkoxy, $C_6$–$C_{10}$-aryloxy, $C_1$–$C_4$-alkylcarbonyl or $C_1$–$C_4$-alkoxycarbonyl, $R^{44}$ and $R^{45}$ are independently of each other unsubstituted or cyano-, hydroxyl-, aminocarbonyl-, $C_1$–$C_4$-mono- or -dialkylaminocarbonyl-, $C_1$–$C_4$-alkoxycarbonyl-, carboxyl-, $C_1$–$C_4$-alkylsulphonyl-substituted $C_1$–$C_6$-alkyl or unsubstituted or hydrogen-, $C_1$–$C_6$-alkyl-, $C_1$–$C_4$-perfluoroalkyl-, halogen-, nitro-, cyano-, $C_1$–$C_4$-alkoxy-, $C_6$–$C_{10}$-aryloxy, $C_1$–$C_4$-alkylcarbonyl-, $C_1$–$C_4$-dialkylamino-, aminocarbonyl-, $C_1$–$C_4$-alkoxycarbonyl-$C_1$–$C_4$-alkylsulphonyl- or $C_6$–$C_{10}$-arylsulphonyl-substituted $C_6$–$C_{10}$-aryl, and $X^-$ is an anion.

A particular aspect of this invention is cationic dyes of the formula (IX) where $R^{38}$ and $R^{39}$ are independently of each other hydrogen, methyl, ethyl, trifluoromethyl, bromine, chlorine, nitro, cyano, methoxy, ethoxy, phenyloxy, methylcarbonyl, ethylcarbonyl, dimethylamino, diethylamino, aminocarbonyl, acetylamino, methoxycarbonyl, ethoxycarbonyl, methylsulphonyl, ethylsulphonyl or phenylsulphonyl, $R^{40}$ and $R^{41}$ are independently of each other methyl, cyanomethyl, cyanoethyl, amidocarbonylethyl, 2-hydroxypropyl, hydroxyethyl, dimethylaminocarbonylethyl, methoxycarbonylethyl, ethylcarboxylethyl or carboxylethyl, provided $R^{40}$ and $R^{41}$ are not both methyl, $R^{42}$ and $R^{43}$ are independently of each other hydrogen, methyl, ethyl, trifluoromethyl, chlorine, nitro, cyano, methoxy, ethoxy, methylcarbonyl, phenoxy, methoxycarbonyl or ethoxycarbonyl, $R^{44}$ and $R^{45}$ are independently of each other methyl, ethyl, cyanoethyl, hydroxyethyl, methanesulphonylethyl, methoxycarbonylethyl, aminocarbonylethyl, dimethylaminocarbonylethyl, phenyl, 2, 3- or 4-tolyl, 2-, 3- or 4-anisidyl, 4-trifluoromethyl, 4-phenoxyphenyl, 3- or 4-acetaminophenyl, 3-or 4-nitro- phenyl, 3- or 4-cyanophenyl, 3- or 4-acetylphenyl, 4-diethylaminophenyl, 4-methoxycarbonylphenyl, 4-ethoxycarbonylphenyl or 4-methylsulphonylphenyl, and $X^-$ is an anion.

A very particular aspect of this invention is cationic dyes of the formula (IX) where $R^{38}$ is hydrogen, methyl, methoxy, phenoxy, nitro, cyano, methoxycarbonyl, ethoxycarbonyl or methanesulphonyl, $R^{39}$ is hydrogen, methyl, trifluoromethyl or cyano, $R^{40}$ is methyl, ethyl, cyanoethyl or hydroxyethyl, $R^{41}$ is methyl, ethyl, cyanoethyl, hydroxyethyl, 2-hydroxypropyl, hydroxycarbonylethyl or aminocarbonylethyl, subject to the proviso that $R^{40}$ and $R^{41}$ are not both methyl, $R^{42}$ and $R^{43}$ are independently of each other hydrogen, methyl or methoxy, $R^{44}$ is hydrogen, methyl, ethyl, cyanoethyl, hydroxyethyl or methanesulphonylethyl, $R^{45}$ is methyl, ethyl, phenyl or 4-methoxyphenyl, and $X^-$ is an anion.

A further aspect of this invention is cationic dyes of the formula

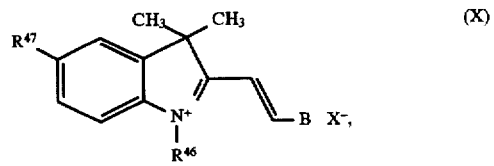

where B represents a structure of the formulae

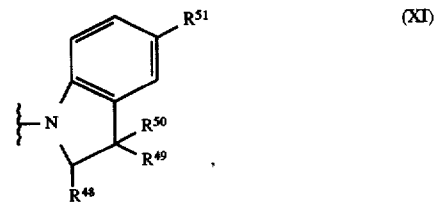

or

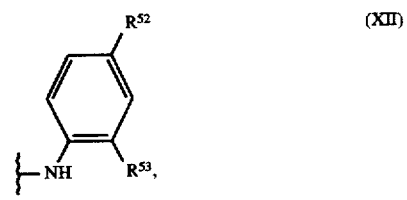

where $R^{46}$ is a linear or branched cyano-$C_1$–$C_4$-alkyl, hydroxy-$C_1$–$C_4$-alkyl, amido $C_1$–$C_4$-alkyl, $C_1$–$C_4$-alkoxycarbonyl-$C_1$–$C_4$-alkyl radical or a 3-sulpholanyl radical, or may additionally be a $C_1$–$C_4$-alkyl radical when B represents the formula (XII) and $R^{52}$ and/or $R^{53}$ are each OH—, CN— or $CONH_2$-substituted $C_1$–$C_4$-alkyl, $R^{47}$ is hydrogen, $C_1$–$C_4$-alkyl, $C_1$–$C_4$-alkoxy or halogen, $R^{48}$, $R^{49}$ and $R^{50}$ are independently of one another hydrogen or $C_1$–$C_4$-alkyl, $R^{51}$ is hydrogen, $C_1$–$C_4$-alkyl, $C_1$–$C_4$-alkoxy or halogen, $R^{52}$ and $R^{53}$ are independently of each other hydrogen, unsubstituted or OH—, CN— or $CONH_2$-substituted $C_1$–$C_4$-alkyl, $C_1$–$C_4$-alkoxy or halogen, and $X^-$ is an anion.

A particular aspect of this invention is cationic dyes of the formula (X) where $R^{46}$ is a cyanoethyl, 2-hydroxypropyl, amidoethyl or 3-sulpholanyl radical or, when B represents the formula (XII) and $R^{52}$ and/or $R^{53}$ denote cyanomethyl or cyanoethyl, may additionally denote a methyl radical, $R^{47}$ is hydrogen, methyl, methoxy, chlorine or bromine, $R^{48}$, $R^{49}$ and $R^{50}$ are independently of each other hydrogen or methyl, $R^{51}$ is hydrogen, methyl, methoxy or chlorine, $R^{52}$ and $R^{53}$ are independently of each other hydrogen, cyanomethyl, cyanoethyl, methoxy or chlorine, and $X^-$ is an anion.

A further aspect of this invention is cationic dyes of the formula

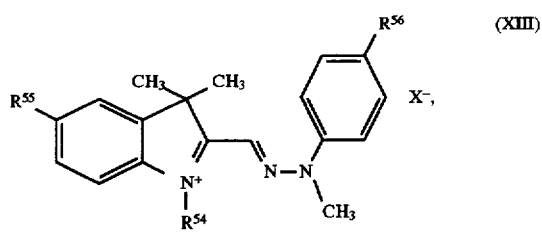

(XIII)

where $R^{54}$ is a linear or branched and CN— or $CONH_2$-substituted $C_1$–$C_3$-alkyl radical, an allyl radical or a 3-sulpholanyl radical, or when $R^{56}$ is OH—, CN— or $CONH_2$-substituted $C_1$–$C_4$-alkyl, may additionally be a linear or branched and optionally OH—, CN— or $CONH_2$-substituted $C_1$–$C_4$-alkyl radical, $R^{55}$ is hydrogen, $C_1$–$C_4$-alkyl, $C_1$–$C_4$-alkoxy or halogen, $R^{56}$ is hydrogen, a linear or branched $C_1$–$C_4$-alkyl, $C_1$–$C_4$-alkoxy, cyano-$C_1$–$C_4$-alkyl, hydroxy-$C_1$–$C_4$-alkyl or amido-$C_1$–$C_4$-alkyl radical, and $X^-$ is an anion.

A particular aspect of this invention is cationic dyes of the formula (XIII) where $R^{54}$ is an amidomethyl, cyanopropyl, allyl or 3-sulpholanyl radical or, when $R^{56}$ is cyanomethyl, may additionally denote a methyl radical, $R^{55}$ is hydrogen, methyl, methoxy or chlorine, $R^{56}$ is hydrogen, methyl, methoxy or cyanomethyl, and $X^-$ is an anion.

A further aspect of this invention is cationic dyes of the formula

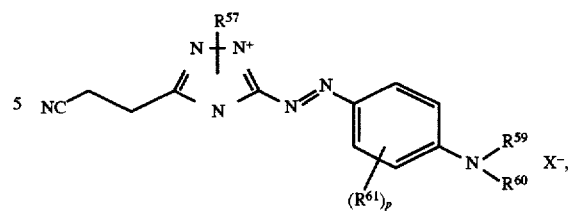

(XIV)

where $R^{57}$ and $R^{58}$ are independently of each other an unsubstituted or OH—, CN— or $CONH_2$-substituted $C_1$–$C_4$-alkyl radical, benzyl or phenethyl, $R^{59}$ and $R^{60}$ are independently of each other hydrogen, a linear or branched $C_1$–$C_4$-alkyl, cyano-$C_1$–$C_4$-alkyl, hydroxy-$C_1$–$C_4$-alkyl, amido-$C_1$–$C_4$-alkyl, $C_1$–$C_4$-alkoxycarbonyl-$C_1$–$C_4$-alkyl radical, benzyl, phenethyl or an unsubstituted or methyl-, methoxy-, acetylamino- or chlorine-substituted phenyl radical, or $NR^{59}R^{60}$ is pyrrolidino, piperidino or morpholino, $R^{61}$ is hydrogen, $C_1$–$C_4$-alkyl, $C_1$–$C_4$-alkoxy, $C_6$-aryl, $C_5$–$C_7$-cycloalkyl, halogen, $C_1$–$C_4$-alkylcarbonylamino or $C_1$–$C_4$-alkylsulphonylamino, p is 1 or 2, and $X^-$ is an anion.

A particular aspect of this invention is cationic dyes of the formula (XIV) where $R^{57}$ and $R^{58}$ are independently of each other methyl, ethyl, propyl, cyanoethyl, hydroxyethyl, 2-hydroxypropyl, amidoethyl or benzyl, $R^{59}$ and $R^{60}$ independently of each other denote linear or branched $C_1$–$C_4$-alkyl or cyano-$C_1$–$C_4$-alkyl radicals, benzyl, phenyl, tolyl or methoxyphenyl, and $R^{59}$ may additionally denote hydrogen, or $NR^{59}R^{60}$ is pyrrolidino or piperidino, $R^{61}$ is ortho relative to the azo group and denotes hydrogen, $C_1$–$C_4$-alkyl, halogen, $C_1$–$C_4$-alkylcarbonylamino or $C_1$–$C_4$-alkylsulphonylamino, p is 1, and $X^-$ is an anion.

A very particular aspect of this invention is cationic dyes of the formula (XIV) where $R^{57}$ and $R^{58}$ are identical and are each methyl, ethyl, cyanoethyl or benzyl, $R^{59}$ and $R^{60}$ are independently of each other methyl, ethyl, cyanoethyl, benzyl or phenyl, and $R^{59}$ may additionally denote hydrogen, $R^{61}$ is ortho to the azo group and denotes hydrogen, methyl, chlorine, bromine, methylcarbonylamino or methylsulphonylamino, p is 1, and $X^-$ is an anion.

A further aspect of this invention is anhydrobases of the formulae

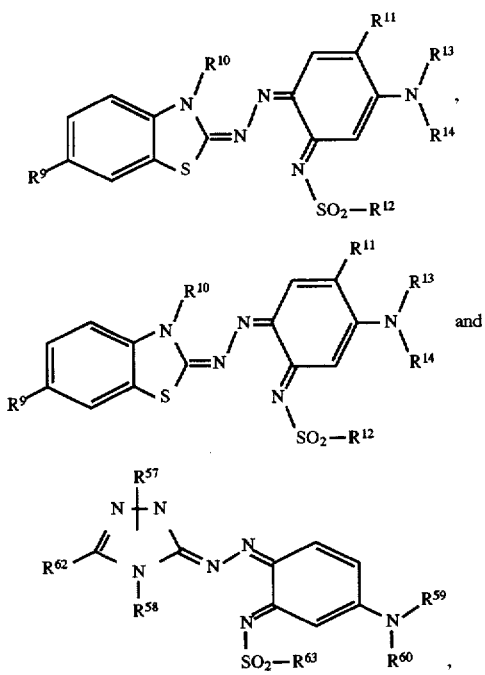

(XV)

(XVI) and (XVII)

where
R$^9$ to R$^{14}$, R$^{20}$ to R$^{25}$ and R$^{57}$ to R$^{60}$ each have the above-specified general, particular or very particular meanings, R$^{62}$ is hydrogen or cyanoethyl, in particular hydrogen, and R$^{63}$ is C$_1$-C$_4$-alkyl, in particular methyl or ethyl.

Alkyl radicals, including modified ones, such as, for example, alkoxy and aralkyl radicals, are preferably those having 1 to 8, preferably 1 to 4, carbon atoms, unless otherwise stated. They can also be branched. Cycloalkyl radicals are to be understood as meaning in particular those having 4 to 7, preferably 5 to 6, carbon atoms.

Alkenyl radicals are those having 2 to 6, preferably 2 or 3, carbon atoms.

Aryl radicals, including those in aralkyl radicals, are preferably phenyl radicals, which may be substituted by from 1 to 3 radicals selected from the group consisting of fluorine, chlorine, methyl, ethyl, methoxy, ethoxy, cyano, hydroxyl and nitro.

Halogen is to be understood as meaning in particular fluorine, chlorine and bromine.

Preferred anions are colourless, organic and inorganic anions, for example fluoride, chloride, bromide, iodide, perchlorate, tetrafluoroborate, hydroxide, hydrogen sulphate, sulphate, dihydrogen phosphate, hydrogen phosphate, phosphate, bicarbonate, carbonate, methylsulphate, ethylsulphate, cyanate, thiocyanate, tri- or tetrachlorozincate, tetrachloroferrate, hexafluorosilicate and anions of saturated or unsaturated aliphatic, cycloaliphatic, aromatic or heterocyclic carboxylic or sulphonic acids such as formate, acetate, hydroxyacetate, cyanoacetate, propionate, hydroxypropionate, oxalate, citrate, lactate, tartrate, the anion of cyclohexanecarboxylic acid, phenylacetate, benzoate, the anion of nicotinic acid, methanesulphonate, ethanesulphonate, benzenesulphonate, chlorobenzenesulphonate or toluenesulphonate. In the case of polyvalent anions, for example sulphate or oxalate, X$^-$ represents one equivalent of such a polyvalent anion.

The cationic dyes of this invention can be prepared by methods known per se.

The dyes of the formula (I) are obtained for example on condensing quaternized 4-methylpyridine with appropriate 4-substituted-amino-benzaldehydes. This can take place for example in solvents such as alcohols, e.g. ethanol, propanol, butanol, pentanol or hexanol, or glycols, e.g. ethylene glycol or propylene glycol, cyclic esters, e.g. ethylene carbonate, propylene carbonate or butyrolactone, and also amides, e.g. dimethylformamide, dimethylacetamide or N-methylpyrrolidone, in the presence of acidic catalysts, e.g. glacial acetic acid or methanesulphonic acid, and/or, preferably, basic catalysts, e.g. piperidine, pyrrolidine, piperazine or pyridine, at temperatures between 70° and 180° C.

The dyes of the formula (II) are obtained for example by condensing suitable cyanoacetic esters with 4-substituted-amino-benzaldehydes. This can take place under conditions as specified in connection with the dyes of the formula (I). However, the reaction temperature is between room temperature and 100° C. Similarly, acetic anhydride, in the presence or absence of the above-described acidic or basic catalysts, is a suitable reaction medium.

The dyes of the formulae (III), (V), (VI), (IX) and (XIV) are obtained for example on diazotizing suitable 2-aminobenzothiazoles, 2-amino-1,3,4-thiadiazoles or 2-amino-5-cyanoethyltriazoles and coupling the diazotization products onto suitable substituted anilines or derivatives thereof and quaternizing the resulting azo dyes with suitable alkylating agents. The diazotization is effected for example in inorganic or organic acids or acid mixtures using sodium nitrite or nitrosylsulphuric acid. The coupling is effected for example in water, inorganic or organic acids or water-miscible solvents or mixtures thereof, with or without a base. The quaternization is effected for example in water, organic acids or solvents or solvent mixtures that are inert towards alkylating agents, with or without a base. Inorganic acids include for example hydrochloric acid, sulphuric acid and phosphoric acid, while organic acids include for example formic acid, acetic acid and propionic acid. Inert solvents include for example the aforementioned organic acids, γ-butyrolactone, N-methylpyrrolidone, acetonitrile, tetramethylene sulphone, toluene, xylene or chlorobenzene. Alkylating agents include for example dimethyl or diethyl sulphate, methyl benzenesulphonate, ethylene oxide, propylene oxide, acrylonitrile, acrylic esters or acrylamide. Suitable bases include for example sodium acetate, potassium acetate, magnesium oxide, triethanolamine or triisopropanolamine.

The dyes of the formula (IV) are obtained for example on tetrazotizing bi-functional aromatic amines of the formula

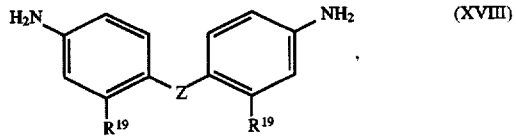

(XVIII)

where
R$^{19}$ and Z are each as defined above, and coupling onto functionalized anilines of the formula

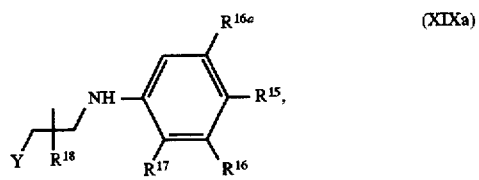

(XIXa)

where
R$^{15}$ to R$^{18}$ are each as defined above and

Y is a leaving group, and subsequent cyclization or by diazotizing aromatic amines of the formula

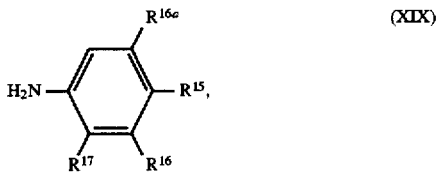

where
$R^{15}$ to $R^{17}$ are each as defined above, and coupling onto functionalized aromatic amines of the formula

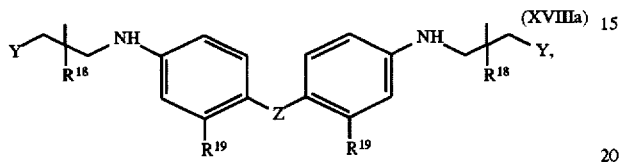

where
$R^{18}$, $R^{19}$ and Z are each as defined above and
Y is a leaving group, and subsequent cyclization.
Examples of leaving groups Y are I, Br, Cl, $OSO_2CH_3$, $OSO_2C_6H_5$, $OSO_3H$ or the like.

Diazotization, tetrazotization and coupling are carried out as described above in connection with the dyes of the formulae (III), (V), (VI), (IX) and (XIV). For the cyclization, it is advantageous to adjust the coupling medium to a neutral to slightly alkaline pH and, if necessary, to employ temperatures between room temperature and 70° C.

The functionalized aromatic amines of the formula (XVIIIa) and anilines of the formula (XIXa) are prepared from the corresponding amines of the formula (XVIII) or anilines of the formula (XIX) by reaction with, for example, aliphatic chloro- or bromoalcohols such as 2-bromoethanol or epoxides such as ethylene oxide or propylene oxide and subsequent conversion of the hydroxyl group into the leaving group Y by, for example, esterification with methanesulphonyl chloride, benzenesulphonyl chloride or sulphuric acid or conversion into the halides using, for example, hydrobromic acid or hydrochloric acid.

The dyes of the formula (X) are prepared by condensing 1-substituted 2-formylmethylene-3,3-dimethylindolines with suitable indolines or anilines. The condensation can be effected with water-eliminating agents such as phosphorus oxychloride, in the presence or absence of solvents, or in solvents in the presence of acidic and/or basic catalysts, in which latter case the water of reaction is advantageously distilled off. The reaction temperature is within the range from room temperature to 60° C. or, in the case of the distillative removal of water, at the boiling point of the solvent or its azeotrope with water. Suitable solvents are preferably aromatic solvents such as toluene, xylene or chlorobenzene and also chloroform and ethylene chloride. Suitable catalysts include for example glacial acetic acid, methanesulphonic acid, benzenesulphonic acid, piperidine, piperazine, pyrrolidine or pyridine.

The dyes of the formula (XIII) are prepared by diazotizing and coupling suitable anilines onto 1-substituted 2-methylene-3,3-dimethylindolines and subsequent quaternization of the dye intermediates. Suitable conditions for diazotization and coupling were described above in connection with the preparation of the dyes of the formulae (II), (V), (VI), (IX) and (XIV). The quaternization can take place in water or solvents or mixtures thereof in the presence of bases at temperatures between room temperature and 80° C. The quaternizing agent used is dimethyl sulphate or, for example, methyl benzenesulphonate. Suitable solvents include aromatic solvents such as toluene, xylene or chlorobenzene, and suitable bases include sodium hydroxide and potassium hydroxide, preferably in the form of their aqueous solutions, magnesium oxide, ethyldiisopropylamine or triisopropanolamine. When using two-phase mixtures of water and solvent it is advisable to add a phase transfer catalyst, for example a quaternary ammonium salt such as triethylbenzylammonium, tetrabutylammonium or methyltrioctylammonium, each in the form of, for example, its chloride or bromide.

The novel cationic dyes of the formulae (I) to (VI), (IX), (X), (XIII) and (XIV) are highly useful for dyeing and printing cationically dyeable fibres, preferably polymers and copolymers of acrylonitrile and dicyanoethylene, and also acid-modified fibres composed of polyamide and polyesters in that fast shades are obtained. These dyeing processes give rise to wastewaters which are generally of low toxicity within the meaning of the definition given at the beginning. The dyes can also find utility for dyeing and printing tannin-treated cellulose materials, paper, silk and leather. They are also suitable for preparing writing fluids, stamp fluids, ballpoint pen pastes and inkjet inks. They can also be used in rubber printing.

The dyeing of, for example, polymers and copolymers of acrylonitrile can be effected for example from a weakly acidic liquor, in which case the dyebath is preferably entered at 40° to 60° C. and then the dyeing carried out at the boil. It is also possible to dye under superatmospheric pressure at temperatures above 100° C. Furthermore, the cationic dyes of this invention can be used for preparing spinning solutions for colouring polyacrylonitrile-containing fibres. The fibres can be spun dry or wet.

The dyeing of paper is effected for example in the aqueous suspension of cellulose fibres before and during the outflow onto the paper machine under acidic to neutral conditions in the presence or absence of organic and/or inorganic sizing agents and in the presence or absence of further papermaking auxiliaries, for example retention aids and/or wet-strength enhancers.

The dyeings of the cationic dyes of this invention on polyacrylonitrile materials are notable for very good light, wet and rub fastness properties. The dyes have high affinity for paper, so that only a small proportion remains in the wastewater of a dyeing.

The cationic dyes of this invention can be used alone, mixed with each other or mixed with other dyes.

The present invention finally also relates to cationically dyed fibres, tannin-treated cellulose materials, paper, silk, leather, writing fluids, stamp fluids, ballpoint pen pastes and inkjet inks, which are characterized in that they comprise at least one dye of the formulae (I) to (VI), (IX), (X), (XIII) and (XIV).

The anhydrobases of the formulae (XV), (XVI) and (XVII) can be obtained from the dyes of the formulae (III), (V) and (XIV), respectively, by reaction with bases. Suitable bases include for example hydroxides such as sodium hydroxide, potassium hydroxide or calcium hydroxide, oxides such as magnesium oxide, alcoholates such as sodium methoxide or amines such as triethylamine, diethanolamine, triethanolamine, piperidine or pyridine. Suitable reaction media for the reaction with such bases include for example water, alcohols such as methanol, ethanol, isopropanol, ketones such as acetone or butanone or mixtures thereof.

The anhydrobases of the formulae (XV), (XVI) and (XVII) are suitable for dyeing polyester fibres and fabrics and also as dyes for sublimation or diffusion transfer printing. Transfer printing for textile application is known for example from U.S. Pat. No. 4,137,042, for application to paper or other substrates for information or image representation for example from EP-A 0 384 040. Of particular interest is transfer printing on paper or comparable substrates such as polymeric films, sheets or webs coated with an acidic layer. Examples of such layers include acid clays or phenolic resins or salicylic acids or salts thereof in suitable binder systems. Anhydrobases of the formulae (XV), (XV) or (XVII) transferred to such acid-coated papers are converted back into the dyes of the formulae (III), (V) and (XIV), respectively, by protonation in the layer.

The invention also relates to polyester fibres and fabrics dyed with anhydrobases of the formulae (XV), (XVI) or (XVII). It also relates to polyester or polyacrylonitrile fabrics printed with these anhydrobases. It similarly relates to materials for sublimation or diffusion transfer printing for the presentation of information or pictures, comprising at least one anhydrobase of the formulae (XV), (XVI) or (XVII) in their donor layer.

EXAMPLES

Example 67: (formula I)

9.4 g of γ-picoline and 6.9 g of propylene glycol were heated to 120° C. 7.3 g of chloroethanol were slowly added dropwise at that temperature. The mixture was subsequently stirred at 120° C. for 1 h and at 140° C. for 3 h. After cooling to 80° C., 17.2 g of N-benzyl-N-hydroxyethylaminobenzaldehyde and 0.7 g of piperidine were added. After 4 h at 80° C. the volatiles were removed by steam distillation. Dilution of the residue with 12 ml of 10:2 water/glacial acetic acid gave a ready-to-use 25 percent strength by weight solution of the dye of the formula (I) where $R^1$=$R^3$=hydroxyethyl, $R^2$=benzyl, $R^4$=hydrogen and $X^-$=chloride.

This solution had an absorption maximum at 432 nm

Lignin-containing paper was dyed in a brilliant orange with good wastewater values.

The dyes of the following table were prepared in a similar manner:

Example 74: (formula II)

30 g of acetic anhydride and 8.5 g of cyanoacetic acid were admixed with 24 g of bishydroxyethyldimethylammonium chloride at room temperature and stirred at room temperature for 12 h. 24.8 g of N-phenethyl-N-(3-dimethylaminopropyl)-aminobenzaldehyde were added and stirring continued at 70° C. for 6 h. The mixture was diluted with 12 g of water and 1.2 g of glacial acetic acid. This gave a ready-to-use solution of the dye of the formula (II) where $R^5$=acetoxyethyl, $R^6$=phenethyl, $R^7$=—$(CH_2)_3$—$N(CH_3)_2$, $R^8$=hydrogen and $X^-$=acetate.

This solution had an absorption maximum at 423 nm.

Lignin-containing paper was dyed in a brilliant greenish yellow with good waste-water values.

The dyes of the following table were prepared in a similar manner:

TABLE

| Example | $R^5$ | $R^6$ | $R^7$ | $R^8$ | $X^-$ | $\lambda_{max}$ a) |
|---|---|---|---|---|---|---|
| 75 | —$(CH_2)_2$—OCOCH$_3$ | —$C_2H_4$—$C_6H_5$ | —$(CH_2)_3$—$N(CH_3)_2$ | $CH_3$ | $Cl^-$ | 435 nm |
| 76 | —$(CH_2)_2$—OCOCH$_3$ | —$C_2H_4$—$C_6H_5$ | —$(CH_2)_3$—$N(C_2H_5)_2$ | H | $Cl^-$ | 424 nm |
| 77 | —$(CH_2)_2$—OCOCH$_3$ | —$CH_2$—$C_6H_5$ | —$(CH_2)_2$—CN | H | $Cl^-$ | 421 nm | a) in 10:2 water/glacial acetic acid

Example 78: (formula III)

18 g of 2-amino-6-methoxybenzothiazole were dissolved in a mixture of 200 ml of glacial acetic acid, 40 ml of 85% strength by weight phosphoric acid and 30 ml of 48% strength by weight sulphuric acid. 34 g of nitrosylsulphuric acid were added dropwise at 0°–5° C. over 30 min. Following 30 min stirring at 0°–5° C. this diazotization batch was added dropwise to a solution of 24.2 g of 3-methanesulphonylamino-N,N-diethylaniline in 200 ml of glacial acetic acid at 0°–5° C. over 30 min. The mixture was stirred overnight at room temperature and discharged onto 3.5 l of water, the mixture was filtered with suction, and the filter residue was washed with water and dried to give 34 g (78.5% of theory) of the dye of the formula

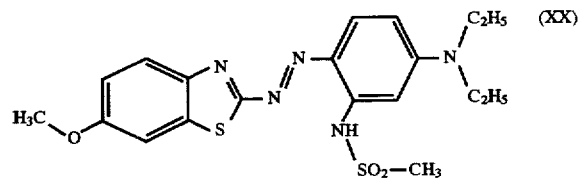

as a violet powder.

34 g of this dye were dissolved in 300 ml of glacial acetic acid and admixed with 6.6 g of sodium acetate and 15.2 ml of dimethyl sulphate at 35° C. After 11 h at that temperature, a further 1.3 g of sodium acetate and 3.0 ml of dimethyl

TABLE

| Example | $R^1$ | $R^2$ | $R^3$ | $R^4$ | $X^-$ | $\lambda_{max}$ a) |
|---|---|---|---|---|---|---|
| 68 | —$(CH_2)_2$—OH | —$CH_2$—$C_6H_5$ | —$(CH_2)_2$—OH | $CH_3$ | $Cl^-$ | 438 nm |
| 69 | —$(CH_2)_2CONH_2$ | —$CH_2$—$C_6H_5$ | —$(CH_2)_2$—OH | H | $Cl^-$ | 474 nm |
| 70 | —$(CH_2)_2$—OH | —$C_2H_5$—$C_6H_5$ | —$(CH_2)_2$—CN | H | $Cl^-$ | 462 nm |
| 71 | —$(CH_2)_2$—OH | —$CH_2$—$C_6H_5$ | —$(CH_2)_2$—CN | H | $Cl^-$ | 456 nm |
| 72 | —$(CH_2)_2CONH_2$ | —$C_2H_4$—$C_6H_5$ | —$(CH_2)_2$—CN | H | $Cl^-$ | 466 nm |
| 73 | —$(CH_2)_2CONH_2$ | —$CH_2$—$C_6H_5$ | —$(CH_2)_2$—CN | H | $Cl^-$ | 458 nm | a) in 10:2 water/glacial acetic acid sulphate were added, and stirring was continued for a further 15 h. Discharging onto 1 l of water, salting out with 300 ml of saturated sodium chloride solution, filtering off with suction, washing with 250 ml of 15 percent strength by weight sodium chloride solution and drying gave 42.3 g (94.5% of theory) of the dye of the formula (III) where $R^9$=methoxy, $R^{10}$=$R^{12}$=methyl, $R^{11}$=hydrogen, $R^{13}$=$R^{14}$=ethyl and $X^-$=methosulphate.

A solution in 9:1 methanol/glacial acetic acid had an absorption maximum at 586 nm.

Polyacrylonitrile fibre was dyed in a slightly reddish blue having good fastness properties.

The dyes of the following table were prepared in a similar manner:

The dyes of the following table were prepared in a similar manner:

TABLE

| Example | $R^9$ | $R^{10}$ | $R^{11}$ | $R^{12}$ | $R^{13}$ | $R^{14}$ | $X^-$ | $\lambda_{max}{}^{a)}$ |
|---|---|---|---|---|---|---|---|---|
| 79 | H | $CH_3$ | H | $CH_3$ | $C_2H_5$ | $C_2H_5$ | $Cl^-$ | 582 nm |
| 80 | H | $CH_3$ | H | $CH_3$ | $C_3H_7$ | $C_3H_7$ | $Cl^-$ | 584 nm |
| 81 | $CH_3$ | —$CH_2CHCH_2$/OH | $OCH_3$ | $C_4H_9$ | $CH_3$ | $CH_3$ | $ZnCl_3{}^-$ | 605 nm |
| 82 | $OCH_3$ | $CH_3$ | H | $CH_3$ | $C_3H_7$ | $C_3H_7$ | $CH_3OSO_3{}^-$ | 589 nm |
| 83 | Cl | —$(CH_2)_2CONH_2$ | H | $C_6H_5$ | —$(CH_2)_4$— | | $Cl^-$ | 591 nm |

$^{a)}$in 9:1 methanol/glacial acetic acid

Example 84: (formula IV)

5.3 g of bis(4-aminophenyl)urea were partly dissolved in 50 ml of water by addition of 15 ml of a 30 percent strength by weight hydrochloric acid. 10.2 ml of an aqueous sodium nitrite solution (30 g of $NaNO_2$ in 100 ml of solution) were added dropwise over ½ h. The mixture was subsequently stirred at room temperature for 1 h.

11.7 g of sodium 2-(4-methoxyanilino)ethoxysulphate were suspended in 80 ml of water. 10.5 g of calcium chloride were added. The above tetrazotization batch was added dropwise over 1 h while the pH was maintained at 8 by addition of solid sodium carbonate. Thereafter the mixture was stirred at 40°–45° C. and pH 8 for 1.5 h. The orange suspension was filtered off with suction, the filter residue was suspended in 300 ml of water, and the solids were again filtered off with suction and dried to give 21.5 g of the dye of the formula (IV) where $R^{15}$=methoxy, $R^{16}$ to $R^{19}$=hydrogen, Z=NHCONH and $X^-$=hydrogen sulphate.

A solution of the dye in 50 percent strength by weight acetic acid had an absorption maximum at 442 nm.

Lignin-free paper was dyed in an intensive brilliant yellow with good wastewater values.

TABLE

| | | | ($R^{18}$ = hydrogen) | | | | | |
|---|---|---|---|---|---|---|---|---|
| Example | $R^{15}$ | $R^{16}$ | $R^{17}$ | $R^{16a}$ | $R^{19}$ | Z | $X^-$ | $\lambda_{max}{}^{a)}$ |
| 85 | $OCH_3$ | $OCH_3$ | H | H | H | —NH— | Br | 450 nm |
| 86 | —NHCOCH$_3$ | H | H | H | H | —$(CH_2)_2$— | $ZnCl_3{}^-$ | 431 nm |
| 87 | —$OC_6H_5$ | H | H | H | $CH_3$ | —NHCOCONH— | Cl | 410 nm |
| 88 | $CH_3$ | H | $CH_3$ | H | H | —$SO_2$— | $Cl^-$ | 398 nm |
| 89 | CN | H | H | H | H | —O— | Cl | 438 nm |
| 90 | H | H | H | $OCH_3$ | H | —NHCO— | $HSO_4{}^-$ | 435 nm |
| 91 | $CH_3$ | $OCH_3$ | H | H | H | —$NHSO_2NH$— | $Cl^-$ | 432 nm |
| 92 | $NO_2$ | H | H | H | H | N—N / \\ O | $Cl^-$ | 402 nm |

$^{a)}$in 50 percent strength by weight acetic acid

Example 93: (formula V)

To a solution of 20.0 g of 2-amino-5-diisopropylamino-1,3,4-thiadiazole and 24.2 g of 3-methanesulphonylamino-N,N-diethylaniline in 200 ml of glacial acetic acid were added dropwise at 10°–15° C. over 90 min 20 ml of 5M aqueous sodium acetate solution. Stirring overnight at room temperature was followed by discharging onto 600 ml of ice-water, filtering off with suction, washing with plenty of water and drying to give 35 g (77% of theory) of the dye of the formula

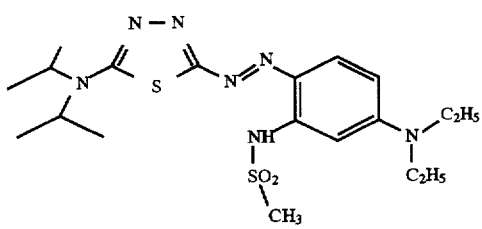

(XXI)

as a red powder.

15 g of this dye were dissolved in 100 ml of glacial acetic acid and admixed with 2.7 g of sodium acetate and 6.3 ml of dimethyl sulphate at 35° C. After 18 h at that temperature, the batch was discharged onto 500 ml of water, and 150 ml of 2M zinc chloride solution were added dropwise, followed by 450 ml of saturated sodium chloride solution, again added dropwise. Stirring overnight was followed by filtering off with suction, washing with 10 percent strength by weight sodium chloride solution and drying to give 14.3 g (65% of theory) of the dye of the formula (V) where $R^{20}=R^{21}=$ isopropyl, $R^{22}=R^{23}=$methyl, $R^{24}=R^{25}=$ethyl and $X^-=ZnC l_3-$.

A solution of the dye in 9:1 methanol/glacial acetic acid had an absorption maximum at 590 nm.

The dye dyed polyacrylonitrile in a reddish blue having good fastness properties.

The dyes of the following table were prepared in a similar manner:

weight nitrosylsulphuric acid at 0° to 5° C. in a mixture of 50 parts of glacial acetic acid, 15 parts of 48% strength by weight sulphuric acid and 5 parts of 85% strength by weight phosphoric acid. After stirring for two hours, the diazonium salt solution was added dropwise to a solution of 23 parts of 1,4-dimethyl-3-spirocyclopentanequinoxalin-2-one and stirred for one hour. Following addition of 100 parts of saturated sodium acetate solution, stirring was continued and the incipient precipitation of the dyebase was completed with concentrated sodium hydroxide solution. This gave 40 parts of dyebase, which were dissolved in 100 parts of glacial acetic acid. At 100° C. three portions of 6 pans of propylene oxide in each portion were added dropwise to this solution through a dip tube. Each portion was followed by two hours of stirring at 100° C. After cooling, 400 parts of saturated sodium chloride solution were added to bring down 32 pans of a dye of the formula (VI) where A=formula (VII), $R^{26}=R^{27}=$isopropyl, $R^{28}=2$-hydroxypropyl, $R^{29}=R^{30}=$methyl, $R^{31}-R^{32}=-(CH_2)_4-$, $R^{33}=$hydrogen and $X^-=$chloride.

A solution in methanol had an absorption maximum at 621 nm.

The dye dyed polyacrylonitrile in a greenish blue shade having excellent fastness properties.

Variation of the substituents on the diazo component and of the alkylating agent and also use of appropriate coupling components gives further coloristically valuable dyes which can be discerned from the following table:

TABLE

| Example | $R^{20}$ | $R^{21}$ | $R^{22}$ | $R^{23}$ | $R^{24}$ | $R^{25}$ | $X^-$ | $\lambda_{max}$ a) |
|---|---|---|---|---|---|---|---|---|
| 94 | —CH(CH$_3$)$_2$ | —CH(CH$_3$)$_2$ | CH$_3$ | CH$_3$ | C$_3$H$_7$ | C$_3$H$_7$ | Cl$^-$ | 594 nm |
| 95 | —CH$_2$CH$_2$OH | CH$_3$ | CH$_3$ | C$_2$H$_5$ | H | C$_6$H$_5$ | ZnCl$_3^-$ | 589 nm |
| 96 | —CH$_2$CH$_2$CN | H | CH$_3$ | CH$_3$ | —(CH$_2$)$_4$— | | CH$_3$OSO$_3^-$ | 588 nm |
| 97 | ⌐⌐⌐SO$_2$⌐⌐⌐ | H | CH$_3$ | C$_4$H$_9$ | —CH$_2$C$_6$H$_5$ | CH$_3$ | ZnCl$_3^-$ | 590 nm | a)in 9:1 methanol/glacial acetic acid

Example 98: (formula VI)

20 parts of 2-amino-5-(diisopropylamino)-1,3,4-thiadiazole were diazotized with 34 parts of 40% strength by

TABLE

| No. | Diazo component | Coupling component | Alkylating agent | $\lambda_{max}$(solvent) [nm] |
|---|---|---|---|---|
| 99 | H$_3$C\N(NC(CH$_2$)$_2$)—C(=N-N=)—S—C(=)—NH$_2$ | spirocyclopentane quinoxalinone with N-CH$_3$ and N-C(=O) | Dimethyl sulphate | 633 (methanol) |
| 100 | " | aryl-N=N with H$_3$C and C(CH$_3$)$_2$CH$_3$ substituents | Dimethyl sulphate | 640 (methanol) |

TABLE-continued

| No. | Diazo component | Coupling component | Alkylating agent | $\lambda_{max}$(solvent) [nm] |
|---|---|---|---|---|
| 101 | 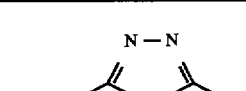 (iProp)₂N—⟨S⟩—NH₂ (N=N) | " | Propylene oxide | 640 (methanol) |
| 102 | " | 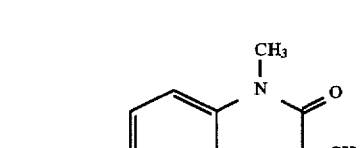 H₃CCONH-phenyl with N(CH₃) and N(CH₃)(CH₃) ring with C=O | Dimethyl sulphate | 608 (glacial acetic acid) |
| 103 | Dimethyl sulphate | 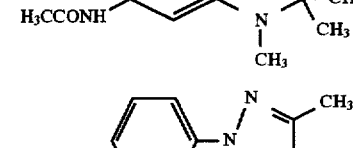 H₃CSO₂NH-phenyl-N(N=C(CH₃)-C(CH₃)(CH₃)-) | " | 616 (methanol) |
| 104 |  (H₃OCH(OH)CH₂)N—⟨S⟩—NH₂ | 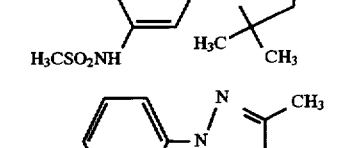 H₃C-phenyl-N(N=C(CH₃)-C(CH₃)(CH₃)-) | Dimethyl sulphate | 641 (methanol) |

Example 105 (formula IX):

6.2 g (25 mmol) of 2-amino-5-N-cyanoethyl,N-phenyl-amino-1,3,4-thiadiazole and 3.0 g (25 mmol) of N,N-dimethylaniline were admixed in 50 ml of acetic acid at 20° C. with 5 ml (25 mmol) of sodium nitrite solution and subsequently stirred for 2 hours. Water was added, and 7.2 g (19 mmol) of a red azo dye was filtered off with suction.

A solution in 9:1 methanol/glacial acetic acid had a $\lambda_{max}$=600 nm and an extinction coefficient $\epsilon$=71,000.

The dye dyed polyacrylonitrile in a greenish blue hue having good fastness properties.

The dyes of the following table were prepared in a very similar manner:

TABLE ($X^-=Cl^-$)

| Ex. | $R^{38}$ | $R^{39}$ | $R^{40}$ | $R^{41}$ | $R^{42}$ | $R^{43}$ | $R^{44}$ | $R^{45}$ | $\lambda_{max}$ a) |
|---|---|---|---|---|---|---|---|---|---|
| 106 | H | H | C₂H₄CN | Me | H | H | Me | Me | 600 nm |
| 107 | H | H | Et | C₂H₄CONH₂ | H | H | C₂H₄CN | Me | 596 nm |
| 108 | Me | H | Me | C₂H₄CN | H | H | C₂H₄CN | Et | 601 nm |
| 109 | H | CF₃ | Me | C₂H₄COOH | H | H | Me | Me | 603 nm |
| 110 | OMe | H | Me | CH₂CH(OH)Me | H | H | C₂H₄SO₂Me | Et | 592 nm |
| 111 | OPh | H | C₂H₄CN | C₂H₄CONH₂ | Me | H | Et | Et | 604 nm |
| 112 | H | Me | C₂H₄OH | Me | H | H | C₂H₄OH | Et | 602 nm |
| 113 | NO₂ | H | Me | C₂H₄CONMe₂ | H | OMe | H | Phenyl | 620 nm |
| 114 | H | CN | C₂H₄CN | Me | H | OMe | H | p-Anisidyl | 618 nm |
| 115 | CO₂Et | H | Et | C₂H₄CONH₂ | H | H | C₂H₄CN | Me | 603 nm |

It was admixed in 100 ml of acetic acid with 3.3 g (40 mmol) of sodium acetate. Following dropwise addition of 3.8 ml (42 mmol) of dimethyl sulphate, the mixture was stirred at 45° C. for one day, at which point a further portion of 3.8 ml (42 mmol) of dimethyl sulphate was added, and heating was continued at 45° C. for a further day. Discharging onto water, salting out with saturated sodium chloride solution/saturated zinc chloride solution, stirring out in 7.5% by weight sodium chloride solution and purification in methanol/ethyl acetate afforded 3.4 g of dried cationic dye of the formula (IX) where $R^{38}=R^{39}=R^{42}=R^{43}$=hydrogen, $R^{40}$=cyanoethyl, $R^{41}=R^{44}=R^{45}$=methyl and $X^-=ZnCl_3^-$ as a black powder.

Example 116 (formula X)

10 parts of 1-(2-hydroxypropyl)-2-formylmethylene-3,3-dimethylindoline were mixed with 25 parts of phosphorus oxychloride. The subsequent addition of 6 parts of 2-methylindoline resulted in the formation of the dye in an exothermic reaction. After the exothermic reaction ceased, the reaction mixture was stirred for a further two hours at room temperature. It was then discharged onto ice. Neutralization, filtration with suction and drying gave 9.2 parts of the dye of the formula (X) where B=formula (XI), $R^{46}$=2-hydroxypropyl, $R^{47}=R^{49}=R^{50}=R^{51}$=hydrogen, $R^{48}$=methyl and $X^-=Cl^-$.

A solution of the dye in methanol had an absorption maximum at 418 nm. The dye dyed polyacrylonitrile in a greenish yellow shade having excellent fastness properties.

Variation of the substituents on the aldehyde component gave further coloristically valuable dyes:

TABLE

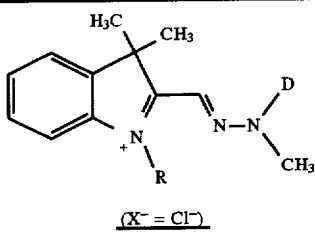

(X⁻ = Cl⁻)

| No. | C | $\lambda_{max}$(solvent) [nm] |
|---|---|---|
| 117 | H₃C structure with CN | 420 (methanol) |
| 118 | H₃C structure with CONH₂ | 420 (methanol) |

Example 119: (formula X)

20.1 parts of Fischer aldehyde and 13.2 parts of 4-cyanomethylaniline in 250 parts of toluene were boiled for six hours under a water separator in the presence of 3 parts of toluenesulphonic acid. After cooling, 10 parts of concentrated hydrochloric acid were added, and the mixture was evaporated to dryness in a rotary evaporator. Redissolving in methanol and clarification with charcoal gave 22 parts of the dye of the formula (X) where B=formula (XII), $R^{46}$=methyl, $R^{47}=R^{53}$=hydrogen, $R^{52}$=cyanomethyl and X⁻=chloride.

The dye had a maximum absorption at 436 nm in methanol.

It dyed polyacrylonitrile with excellent fastness properties in a golden yellow shade.

Example 120: (formula X)

Proceeding in the same way with 1-(3-sulpholanyl)-2-formylmethylene-3,3-dimethylindoline and p-anisidine as starting materials afforded, in a 96% yield, a very fast golden yellow dye of the formula (X) where B=formula (XII), $R^{46}$=sulpholan-3-yl, $R^{47}=R^{53}$=hydrogen, $R^{52}$=methoxy and X⁻=chloride.

It had an absorption maximum of 438 nm in methanol.

Example 121: (formula XIII)

12.3 parts of p-anisidine were dissolved in 80 parts of half-concentrated hydrochloric acid and diazotized with a solution of 7.2 parts of sodium nitrite in 13 parts of water at 0° C. 21.6 parts of 1-aminocarbonylmethyl-2-methylene-3,3-dimethylindoline and 120 parts of 20% strength by weight sodium acetate solution were added to the solution and stirred in overnight at room temperature of saturated sodium of saturated sodium acetate solution were added to bring down the dyebase, which was then filtered off with suction. 31 parts of this intermediate were dissolved in 100 parts of chlorobenzene and admixed with 50 parts of concentrated sodium hydroxide solution and also 5 parts of triethylbenzylammonium chloride. At 60° C. 20 parts of dimethyl sulphate were then added dropwise, and the batch was subsequently stirred at the same temperature for four hours. The dye of the formula (X/II) where $R^{54}$=amidocarbonylmethyl, $R^{55}$=hydrogen, $R^{56}$=methoxy and X⁻=methosulphate precipitated in a yield of 34 parts was filtered off with suction and dried.

In methanol it had an absorption maximum of 436 nm.

The dye dyed polyacrylonitrile in a golden yellow shade having excellent fastness properties.

Variation of the substituents on the methylene base and use of appropriate diazo components gives further coloristically valuable dyes:

TABLE

| No. | R (= $R^{54}$) | D | $\lambda_{max}$(solvent) [nm] |
|---|---|---|---|
| 122 | —CH₂CH₂CH₂CN | phenyl-OCH₃ | 440 (methanol) |
| 123 | —CH₂CH=CH₂ | " | 448 (methanol) |
| 12 | sulpholanyl (O₂S ring) | " | 418 (DMF) |
| 125 | —CH₃ | phenyl-CH₂CN | 440 (methanol) |

Example 126: (formula XIV)

13.7 parts of 2-amino-5-cyanoethyl-1,2,4-triazole were diazofized in a mixture of 50 parts of glacial acetic acid, 15 parts of 48% strength by weight sulphuric acid and 5 parts of 85% strength by weight phosphoric acid at −5° C. using 34 parts of 40% strength by weight nitrosylsulphuric acid and subsequently stirred at 0° C. for 2 hours. This diazotization batch was added dropwise to a solution of 16 parts of N-methyl-N-cyanoethylaniline in 100 parts of glacial acetic acid and the batch was stirred at room temperature for 30 minutes. 100 parts of saturated sodium acetate solution were added to precipitate the dyebase. The resulting 15.4 parts of the precursor were suspended in 50 parts of water, rendered alkaline with concentrated sodium hydroxide solution and admixed with 3 parts of magnesium oxide. 18.9 parts of dimethyl sulphate were then added dropwise and stirred in overnight at room temperature. Following renewed addition of 6.6 g of dimethyl sulphate the batch was stirred for 8 hours and then admixed with zinc chloride to precipitate 9.8 parts of the dye of the formula (XIV) where $R^{57}=R^{58}=R^{59}$=methyl, $R^{60}$=2-cyanoethyl, $R^{61}$=hydrogen, p=1 and X⁻=ZnCl₃⁻.

The dye had an absorption wavelength of 522 nm in dimethylformamide.

It dyed polyacrylonitrile in a brilliant red shade having excellent fastness properties.

Example 127: (formula XIV)

A similarly useful dye is obtained on using diethylaniline instead of N-methyl-N-cyanoethylaniline. The absorption maximum of the dye thus obtained, where $R^{57}=R^{58}=$ methyl, $R^{60}=R^{61}=$ethyl, $R^{61}=$hydrogen, p=1 and $X^-=ZnC_{13}^-$, was 540 nm in methanol.

Example 128: (dyeing of polyacrylonitrile)

0.1 g of the cationic dye of Example 25 were pasted up in 2 ml of water with a little acetic acid and dissolved with 50 ml of hot water. Then 1.2 g of a condensation product of naphthalenesulphonic acid and formaldehyde were added, and the batch was made up to 500 ml with cold water.

The pH of this dyeing liquor was adjusted to 4.5 to 5 with acetic acid and sodium acetate. In this dyeing liquor, 10 g of polyacrylonitrile fibre piece goods were constantly agitated while the temperature was raised to 100° C. over 30 min. Dyeing was continued at the boil for 60 min, and the material was then rinsed with cold water and dried at 60°–70° C.

The result obtained was an intensively neutrally blue coloured piece of cloth having good coloristic fastness properties. The same method can be applied to the dyes of Examples 4 to 24, 26 to 48, 55 to 66, 78 to 83 and 93 to 127.

Example 129: (dyeing of groundwood-containing paper)

A dry stock consisting of 60% groundwood and 40% unbleached sulphite pulp was beaten up in a hollander with sufficient water and ground to a freeness of 40° SR such that the solids content was somewhat above 2.5%. Water was then added to set the solids content of the thick stock to exactly 2.5%. 200 g of this thick stock were admixed with 5 g of a 0.5 percent strength by weight aqueous solution of the dye of Example 2, stirred for 5 min, admixed with 2% of resin size and 4% of alum, based on dry stock, and again stirred for a few minutes until homogeneous. The furnish was then diluted with water to 700 ml and used to prepare sheets of paper in a known manner by sucking down on a sheet former. The sheets of paper obtained had an intensively greenish yellow colouring.

The same method can be applied for the dyes of Examples 1, 3, 5, 6, 19, 21, 30 to 36, 49 to 53, 67 to 83 and 93 to 97.

Example 130: (dyeing of groundwood-free paper)

5 g of a mixture of 70% by weight of birch wood sulphate pulp and 30% of pinewood sulphate pulp were ground in a laboratory hollander in 395 ml of water to 30° to 40° SR. This mixture was made up to 1 l with water. A solution of 25 ml of the dye of Example 84 in 2.5 ml of water, 10 ml of a 1 percent strength by weight aqueous solution of the resin size Dynacoll VS 50 from Akzo Chemie, Düren, and 15 ml of a 1 percent strength by weight aqueous solution of aluminium sulphate were added to the solution, which was stirred for 8 minutes between the additions. The dyed and sized paper furnish was introduced into a laboratory sheet former, uniformly distributed and sucked down. Subsequently the yellow sheet of paper was pressed between filter paper for drying.

The dyes of Examples 85 to 92 were applied by a very similar method.

Example 131: (formula XV)

11.2 g of the dye of Example 78 were dissolved in 100 ml of methanol. 20 ml of 10 percent strength by weight sodium hydroxide solution were added dropwise. The result was a violet suspension, which was filtered off with suction and washed with methanol and water. Drying left 6.5 g (73% of theory) of the dye of the formula (XV) where $R^9=$methoxy, $R^{10}=R^{12}=$methyl, $R^{11}=$hydrogen and $R^{13}=R^{14}=$ethyl as a violet powder.

A solution in dimethylformamide had an absorption maximum at 531 nm.

The dyes of the two following tables were prepared in a similar manner:

TABLE (anhydrobases of the formula XV)

| Example | $R^9$ | $R^{10}$ | $R^{11}$ | $R^{12}$ | $R^{13}$ | $R^{14}$ | $\lambda_{max}$ a) |
|---|---|---|---|---|---|---|---|
| 132 | H | $CH_3$ | H | $CH_3$ | $C_2H_5$ | $C_2H_5$ | 527 nm |
| 133 | H | $CH_3$ | H | $CH_3$ | $C_3H_7$ | $C_3H_7$ | 529 nm |
| 134 | $CH_3$ | $-CH_2CHCH_2/OH$ | $OCH_3$ | $C_4H_9$ | $CH_3$ | $CH_3$ | 550 nm |
| 135 | $OCH_3$ | $CH_3$ | H | $CH_3$ | $C_3H_7$ | $C_3H_7$ | 533 nm |
| 136 | Cl | $-(CH_2)_2CONH_2$ | H | $C_6H_5$ | $-(CH_2)_4-$ | | 534 nm | a)in dimethylformamide

TABLE

| Example | $R^{20}$ | $R^{21}$ | $R^{22}$ | $R^{23}$ | $R^{24}$ | $R^{25}$ | $\lambda_{max}$ a) |
|---|---|---|---|---|---|---|---|
| 137 | $-CH(CH_3)_2$ | $-CH(CH_3)_2$ | $CH_3$ | $CH_3$ | $C_2H_5$ | $C_2H_5$ | 545 nm |
| 138 | $-CH(CH_3)_2$ | $-CH(CH_3)_2$ | $CH_3$ | $CH_3$ | $C_3H_7$ | $C_3H_7$ | 548 nm |
| 139 | $-CH_2CH_2OH$ | $CH_3$ | | $CH_3$ | $C_2H_5$ | H | $C_6H_5$ | 547 nm |
| 140 | $-CH_2CH_2CN$ | H | | $CH_3$ | $CH_3$ | $-(CH_2)_4-$ | | 541 nm |
| 141 | 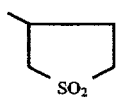 | H | | $CH_3$ | $C_4H_9$ | $-CH_2C_6H_5$ | $CH_3$ | 542 nm | a)in dimethylformamide

Example 142: (transfer printing)

A 2 percent strength by weight solution of the dye of the Example 131 was used to saturate a filter paper strip, which was then dried. This paper strip was then placed on top of the coated side of a commercially available CF paper for no-carbon copy papers, whose receptor layer consisted of activated clay (Reacto®, from Köhler). The filter paper was written on with a hot glass rod. In the process, the dye was transferred to the receptor paper where it produced an intensive reddish blue marking.

We claim:

1. A method for reducing the toxicity of spent liquors from dyeing with cationic dyes of mixtures thereof, which comprises the steps of computing the electrostatic shielding energy of cationic dyes, selecting those dyes which have a computed electrostatic shielding energy and dyeing with one or more of said selected dyes of $\geq 50$ kcal/mol.

2. The method of claim 1, in which the computed electrostatic shielding energy is more than 55 kcal/mol.

3. The method of claim 1, in which the cationic dyes used have at least two hydrophylic radicals.

4. The method of claim 1, in which the cationic dyes used have at least two hydrophilic radicals which carry polar groups containing hereto atoms selected from the group consisting of oxygen, nitrogen, fluorine and sulphur.

5. The method of claim 1, in which the cationic dyes used have at least two hydrophilic radicals which carry polar groups selected from the group consisting of perfluoro-$C_1$-$C_4$-alkyl, $C_1$-$C_3$-alkoxy, cyano, nitro, $SO_2$, $C=O$, hydroxyl, NH and —O—.

6. A method of dyeing and printing polymers and copolymers of acrylonitrile and dicyanoethylene, and acid-modified fibers composed of polyamide and polyester, which comprises the steps of computing the electrostatic shielding energy of cationic dyes, selecting those dyes which have a computed electrostatic shielding energy of $\geq 50$ kcal/mol and dyeing said polymers, copolymers and acid-modified fibers with one or more of said selected dyes.

7. A method of dyeing and printing tannin-treated cellulose materials, paper, silk and leather which comprises the steps of computing the electrostatic shielding energy of cationic dyes, selecting those dyes which have a computed electrostatic shielding energy of $\geq 50$ kcal/mol and dyeing said tannin-treated cellulose materials, paper, silk and leather with one or more of said selected dyes.

8. A method of preparing writing fluids, stamp fluids, ballpoint pen pastes and inkjet inks which comprises the steps of computing the electrostatic shielding energy of cationic dyes, selecting those dyes which have a computed electrostatic shielding energy of $\geq 50$ kcal/mol and including one or more of said selected dyes in said writing fluids, stamp fluids, ballpoint pen pastes or inkjet inks.

* * * * *

UNITED STATES PATENT AND TRADEMARK OFFICE
CERTIFICATE OF CORRECTION

PATENT NO.   : 5,725,607
DATED        : March 10, 1998
INVENTOR(S)  : Giera, et al.

It is certified that error appears in the above-indentified patent and that said Letters Patent is hereby corrected as shown below:

Title Page, Item: [75] Inventors: After " Felix Reichel, both of " insert -- Bergisch --

Col. 45, line 16   After " energy " insert -- of $\geq$50 kcal/mol --

Col. 45, line 17   After " dyes " delete " of $\geq$50 kcal/mol "

Signed and Sealed this

Twenty-ninth Day of December, 1998

Attest:

BRUCE LEHMAN

*Attesting Officer*     *Commissioner of Patents and Trademarks*